(12) United States Patent
Lee et al.

(10) Patent No.: US 10,750,070 B2
(45) Date of Patent: Aug. 18, 2020

(54) LIGHT-EMITTING DIODE AND SURVEILLANCE CAMERA DEVICE USING THE SAME

(71) Applicant: LIGITEK ELECTRONICS CO., LTD., New Taipei (TW)

(72) Inventors: Hsiao-Wen Lee, Taoyuan (TW); I-Hsin Tung, New Taipei (TW)

(73) Assignee: Ligitek Electronics Co., Ltd., New Taipei (TW)

( * ) Notice: Subject to any disclaimer, the term of this patent is extended or adjusted under 35 U.S.C. 154(b) by 69 days.

(21) Appl. No.: 15/641,641

(22) Filed: Jul. 5, 2017

(65) Prior Publication Data

US 2017/0302834 A1   Oct. 19, 2017

Related U.S. Application Data

(63) Continuation-in-part of application No. 14/974,359, filed on Dec. 18, 2015, now abandoned.

(30) Foreign Application Priority Data

Sep. 30, 2016   (EP) ..................................... 16191833

(51) Int. Cl.
*F21V 5/04* (2006.01)
*H04N 5/225* (2006.01)
(Continued)

(52) U.S. Cl.
CPC ............. *H04N 5/2256* (2013.01); *F21V 5/04* (2013.01); *F21V 19/003* (2013.01); *F21V 29/70* (2015.01);
(Continued)

(58) Field of Classification Search
CPC ........ H04N 5/2256; H04N 7/183; H04N 5/33; H04N 5/2252; G03B 15/03;
(Continued)

(56) References Cited

U.S. PATENT DOCUMENTS

2006/0102914 A1*   5/2006   Smits ...................... H01L 33/54
257/98
2013/0335980 A1*   12/2013   Nakasuji ................. F21S 8/026
362/341

(Continued)

FOREIGN PATENT DOCUMENTS

JP            5745578 B2 *   7/2015   ............ F21V 7/0008

OTHER PUBLICATIONS

Wikipedia—Dioptre (Year: 2019).*

*Primary Examiner* — Diane I Lee
*Assistant Examiner* — Glenn D Zimmerman
(74) *Attorney, Agent, or Firm* — Rosenberg, Klein & Lee

(57) ABSTRACT

A light-emitting diode (LED) includes s a substrate, a LED chip, and an optical lens. The LED chip is fixedly mounted to the substrate for emitting a light beam. The optical lens is mounted to the substrate and covers the LED chip. The optical lens has a light exit surface, which directs the light beam from the LED chip to travel in a direction along an optical axis to form a non-symmetric light shape. Also disclosed is a surveillance camera device that uses the LED. As such, the drawback of a conventional surveillance camera being incapable of acquiring an excellent image due to light source being overly concentrated can be eliminated.

13 Claims, 23 Drawing Sheets
(4 of 23 Drawing Sheet(s) Filed in Color)

(51) Int. Cl.
*F21V 33/00* (2006.01)
*F21V 29/70* (2015.01)
*F21V 19/00* (2006.01)
*H04N 7/18* (2006.01)
*H04N 5/33* (2006.01)
*G02B 19/00* (2006.01)
*G03B 15/03* (2006.01)
*F21Y 115/10* (2016.01)

(52) U.S. Cl.
CPC ...... *F21V 33/0052* (2013.01); *G02B 19/0014* (2013.01); *G02B 19/0061* (2013.01); *G02B 19/0066* (2013.01); *G03B 15/03* (2013.01); *H04N 5/33* (2013.01); *H04N 7/183* (2013.01); *F21Y 2115/10* (2016.08); *G03B 2215/0567* (2013.01); *H04N 5/2252* (2013.01)

(58) Field of Classification Search
CPC ........ G03B 2215/0567; G02B 19/0014; G02B 19/0066; G02B 19/0061; F21V 29/70; F21V 19/003; F21V 33/0052; F21V 5/04; F21Y 2115/10
See application file for complete search history.

(56) References Cited

U.S. PATENT DOCUMENTS

| | | | |
|---|---|---|---|
| 2015/0204510 A1* | 7/2015 | Park | F21V 5/04 362/332 |
| 2015/0255687 A1* | 9/2015 | Tong | H01L 33/507 257/88 |
| 2015/0276170 A1* | 10/2015 | Motoyanagi | F21V 5/04 362/335 |
| 2016/0063326 A1* | 3/2016 | Yamashita | G06K 9/00604 348/78 |
| 2017/0254518 A1* | 9/2017 | Vasylyev | G02B 6/0083 |

* cited by examiner

LIGHT-EMITTING DIODE AND SURVEILLANCE CAMERA DEVICE USING THE SAME

CROSS-REFERENCE TO OTHER APPLICATIONS

This application is a continuation-in-part of U.S. patent application Ser. No. 14/974,359, filed on Dec. 18, 2015 and entitled ILLUMINATION MODULE FOR CREATING LATERAL RECTANGULAR ILLUMINATION WINDOW, which claims priority to Europe Patent Application No. EP16191833.9, filed on Sep. 30, 2016, the complete subject matter of both which are hereby incorporated herein by reference.

FIELD OF THE INVENTION

The present invention relates to a light-emitting diode (LED), and in particular to a light-emitting diode for use in an imaging system and a surveillance camera device using the light-emitting diode.

BACKGROUND OF THE INVENTION

Security surveillance systems are very widely used in areas, where surveillance is necessary, such as factories, dormitories, stores, entrances of buildings and community housings, or secret and hidden places, where people rarely go, so that the security surveillance systems may make recording of instantaneous image information by means of transmitter modules and receiver modules thereof (including lighting modules and imaging systems).

A common problem of using the security surveillance system in nighttime is that lighting is insufficient and the image gets unclear and blurring. The security surveillance system is often built in with a lighting module including an infrared light-emitting diode or an infrared laser source in order to allow the imaging system to acquire a clear image thereby allowing the security surveillance system to carry out effective surveillance even in a light-insufficient area. However, a regular light-emitting diode or laser source usually generates a light shape that is an isotropic circular-symmetry light shape, in which light intensity in a central zone is far greater than that at a peripheral zone so that an edge of an image becomes relatively dark with inhomogeneous lighting brightness, whereby the security surveillance may not retrieve clear image information of an object located in the peripheral zone of an acquired image.

Referring to FIG. 14a, which is a schematic view illustrating image information acquired with a conventional surveillance camera device, a regular light-emitting diode or laser source usually generates a light shape that is a circular-symmetry light shape, in which light intensity in a central zone is often far greater than that at a peripheral zone so that the camera cannot clearly photograph an object located in the peripheral zone of an imaged area. Thus, a dark zone A appears in the peripheral zone of the image information. For instance, FIGS. 16a to 16d show a variety of the half-power view angles of the circular-symmetry light shape (which is a light angle that light intensive value is half of the intensive value of the axis direction) of the light receiving plane homogeneity diagrams, wherein the half-power view angles are 120, 90, 60 and 45 degrees in sequence, which shows the light are centralized in the center portion.

Referring to FIG. 14b, which is another schematic view illustrating image information acquired with a conventional surveillance camera device, to match a specific image aspect ratio (such as 4:3) acquired with the camera, a known lens mechanism usually has a rectangular opening. This arrangement may lead to a great loss of optical energy E and results in poor coverage so that an image of a photographed object is trimmed by the rectangular opening, causing distortion of a portion of the image.

Thus, to improve object image information retrieved from the peripheral zone by the security surveillance system, the known designs of the security surveillance systems often involve a large number of lighting modules, such as infrared light-emitting diodes and infrared laser sources to enhance brightness for optical lenses, or more than one optical devices are used, such as optical lenses or reflectors, in order to conduct optical adjustment through reflection and refraction of light to thereby enhance clarity and sharpness of a surveillance image, wherein air or other filling materials that are different from the materials of the optical devices are present between the optical devices and the lighting modules. Such optical devices are so called secondary optical devices. As shown in FIG. 15, which is a schematic view illustrating a known surveillance camera device mounted to a ceiling, the known camera device 5 is attached to a ceiling 6 and the camera device 5 comprises a casing 51, an image capturing element 52, and at least one light supplementing structure 53. The light-supplementing structure 53 comprises a light reflector 531 and a light emission module 532 and uses multiple reflection surfaces 5311, 5312 of the light reflector 531 to convert, through light reflection, circular-symmetry light generated by the light emission module 532 to generate a special light shape fit to the camera device 5 so as to increase illumination on the ceiling 6 and in an area under the ceiling 6 and to enhance clarity of an image captured by the image capturing element 52 thereby eliminating the problem that no high quality image can be acquired by the camera device 5 due to insufficient illumination. However, such an arrangement still suffers the following problems:

(1) Since the secondary optical arrangement uses reflection and refraction of light to generate non-symmetric light shape, the overall lighting efficiency deteriorates due to multiple times of reflection and refraction of light. During an operation of the surveillance device in nighttime, in order to meet the illumination required for nighttime imaging, the illumination must be increased due to loss caused by multiple time of reflection and refraction and thus, power consumption of the security surveillance system becomes excessively high.

(2) Although design difficulty of a secondary optical arrangement is low for there are multiple optical design parameters involved, yet positional shift may readily occur during an assembly process of the optical elements and the light emission modules. In addition to difficulty of assembly and increased manufacturing cost due to complicated parts involved, the size of the surveillance camera device may get bulky so that thinning and miniaturization are not possible.

Thus, it is one of the issues that need to be overcome by those devoted themselves in research and study in this field to increase illumination, homogeneity, and coverage of a surveillance camera in order to acquire excellent imaging result and also to lower down power consumption and reduce the size of the surveillance camera.

SUMMARY OF THE INVENTION

In view of the above problems, the primary objective of the present invention is to provide a light-emitting diode and a surveillance camera device that uses the light-emitting diode, wherein the light-emitting diode may directly generate an illumination area that is a homogeneous and non-symmetric light shape to be directly used in a surveillance camera device without involving secondary optical devices to increase homogeneity and illumination coverage of an image acquired by the surveillance camera and to shrink a dark zone of an image captured by the surveillance camera, and also to reduce optical loss of light caused by secondary optical devices thereby greatly reducing the size and power consumption of the surveillance camera device and achieving an effect of saving manufacturing cost and electrical power.

To achieve the above objective, the present invention adopts a technical solution that is a light-emitting diode (LED), which comprises a substrate, a LED chip, an optical lens, and a wiring layer. The substrate has an installation surface; the wiring layer is formed on the installation surface; the LED chip has an optical axis and is fixedly mounted on the installation surface and is in electrical connection with the wiring layer; and the optical lens is fixedly mounted to the installation surface and encapsulates the LED chip, wherein the optical lens is formed to comprise a light exit surface, wherein a large width extension direction of the light exit surface is defined as an X-axis direction; a small width extension direction of the light exit surface is defined as a Y-axis direction, the X-axis direction and the Y-axis direction being perpendicular to each other; and a direction perpendicular to the installation surface is defined as a Z-axis direction, wherein the light exit surface protrudes from the installation surface in the Z-axis direction and the light exit surface is formed of at least two curved surfaces having different curvatures and is provided to direct a light beam emitting from the LED chip to travel in a direction along the optical axis to project onto a light receiving plane and forming a non-symmetric light shape, wherein the non-symmetric light shape is roughly a rectangle or an ellipse.

Further, the wiring layer is made of a material selected from gold, silver, and copper, or an alloy thereof.

Further, the non-symmetric light shape has an aspect ratio between 1.51 and 1.6.

Further, the light exit surface further comprises a divergent surface and a convergent surface.

Further, the LED chip generates visible light having white light color temperature between 2700K and 7000K.

Further, the LED chip generates ultraviolet light having a wavelength between 365 and 405 nm.

Further, the LED chip generates ultraviolet light having a wavelength of 365 nm.

Further, the LED chip generates ultraviolet light having a wavelength of 385 nm.

Further, the LED chip generates ultraviolet light having a wavelength of 395 nm.

Further, the LED chip generates ultraviolet light having a wavelength of 405 nm.

Further, the LED chip generates infrared light having a wavelength between 750 and 1000 nm.

Further, the LED chip generates infrared light having a wavelength between 790 and 830 nm.

Further, the LED chip generates infrared light having a wavelength between 830 and 870 nm.

Further, the LED chip generates infrared light having a wavelength between 900 and 1000 nm.

Further, the LED chip comprises a laser emitting semiconductor that generates infrared light having a wavelength between 800 and 1000 nm.

Further, the number of the at least one LED chip is one and the at least one LED chip has a shape of square.

Further, the number of the at least one LED chip is plural arranged to form a light emission array, wherein the light emission array has a shape of square and the LED chips of the light emission array are arranged in a tight arrangement.

Further, the LED chips are spaced from each other by a spacing distance between 0.0508 and 0.1016 mm.

Further, the substrate comprises a metal substrate, a ceramic substrate, or a glass fiber substrate.

Further, the metal substrate is made of a material selected from copper, copper alloy, aluminum, aluminum alloy, magnesium alloy, aluminum silicon carbide, and carbon composition.

Further, the ceramic substrate is made of a material selected from aluminum oxide, aluminum nitride, zirconium oxide, silicon carbide, hexagonal boron nitride, and fluorinated carbon.

Further, the optical lens has no air gap with respect to the substrate and the at least one LED chip.

Further, the optical lens is asymmetric.

Further, the light exit surface of the optical lens is selected from an aspheric surface, a cambered surface, a parabolic surface, a hyperbolic surface, and a free-form surface.

Further, the optical lens satisfies the following condition 1:

$$0.3 < D1/D2 \leq 3 \qquad \text{[condition 1]}$$

wherein D1 is the widthwise distance between two outermost side edges of the light exit surface along the Y-axis, and D2 is the lengthwise distance between two opposite ends of the light exit surface along the X-axis.

Further, the optical lens satisfies the following condition 2:

$$0.1 \leq L1/D1 \leq 0.5; 0.1 \leq L2/D2 \leq 0.5 \qquad \text{[condition 2]}$$

wherein D1 is the widthwise distance between two outermost side edges of the light exit surface along the Y-axis; D2 is the lengthwise distance between two opposite ends of the light exit surface along the X-axis; L1 is a widthwise distance of the LED chip along the Y-axis; and L2 is a lengthwise distance of the LED chip along the X-axis.

Further, the optical lens further satisfies the following condition 3:

$$0.65 < D3/D4 < 1 \qquad \text{[condition 3]}$$

wherein D3 is a distance from the installation surface to a lowest surface of the divergent surface in a direction along the optical axis, and D4 is a distance from the installation surface to a highest surface of the convergent surface in a direction along the optical axis.

Further, the equation of the aspheric surface is as follows:

$$z = \frac{cr^2}{1 + \sqrt{1 - (1+k)c^2 r^2}} + \sum_{i=1}^{n} a_i a^{2i}$$

where c denotes curvature, r indicates radius of curvature of an apex, and k indicate conic constant, and c=1/r and k=−0.522, and r=9.03.

Further, the light exit surface of the optical lens is such that a light shape passing through the X-axis is a bat-wing shape having a half-power view angle between 40 and 160 degrees and a light shape passing through Y-axis is an axis-symmetric light shape or a bat-wing shape having a half-power view angle between 30 and 100 degrees.

Further, when the light exit surface of the optical lens is a free-form surface, a light shape passing through the X-axis is a bat-wing shape having a half-power view angle of 130 degrees and a light shape passing through Y-axis is an axis-symmetric light shape or a bat-wing shape having a half-power view angle of 85 degrees.

Further, when the light exit surface of the optical lens is an aspheric surface, a light shape passing through the X-axis is an axis-symmetric light shape having a half-power view angle of 47 degrees and a half-power view angle of the Y-axis is 31 degrees.

Further, the optical lens is formed of a material selected from epoxy resin, acrylic resin, silicon resin, and silicone.

Further, the optical lens has a refractive index of 1.4~1.6.

The present invention discloses a surveillance camera device that comprises a casing, at least one of the above-described LED, and an image capturing element, the image capturing element capturing an image, wherein the at least one LED is arranged at one side of the image capturing element because light generated by the LED can be directly and homogeneously distributed in a photographing range of the image capturing element so as to prevent the surveillance camera from being incapable of capturing a good image due to insufficiency of light intensity in a local area.

The efficacy of the present invention is that the present invention is applicable to a security surveillance system. A light-emitting diode according to the present invention adopts primary optical design to allow for direct projection of light shape of a non-symmetric configuration for matching an imaging system of the security surveillance system, without the need of additional optical elements for secondary optic design thereby effectively improving utilization performance of the light source, simplifying parts design of the security surveillance system to reduce the number of other optic elements involved and thus reducing the overall size of the security surveillance system and also to reduce distortion of image compression and conversion. The light exit surface of the optical lens allows for effective adjustment of the light shape projecting from the LED chip to directly form a non-symmetric light shape and to ensure excellent illuminated image for the surveillance camera device of the security surveillance system and to reduce loss of luminous intensity caused by secondary optics to thereby achieve an effect of energy saving by reducing power consumption. Thus, the present invention can effectively improve the drawback of the security surveillance field that a non-symmetric light shape can only be formed with secondary optic designs so as to lower down the cost of development and design of security surveillance systems.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will be apparent to those skilled in the art by reading the following description of preferred embodiments thereof with reference to the drawings, in which.

DETAILED DESCRIPTION OF THE PREFERRED EMBODIMENTS

Figure 1:
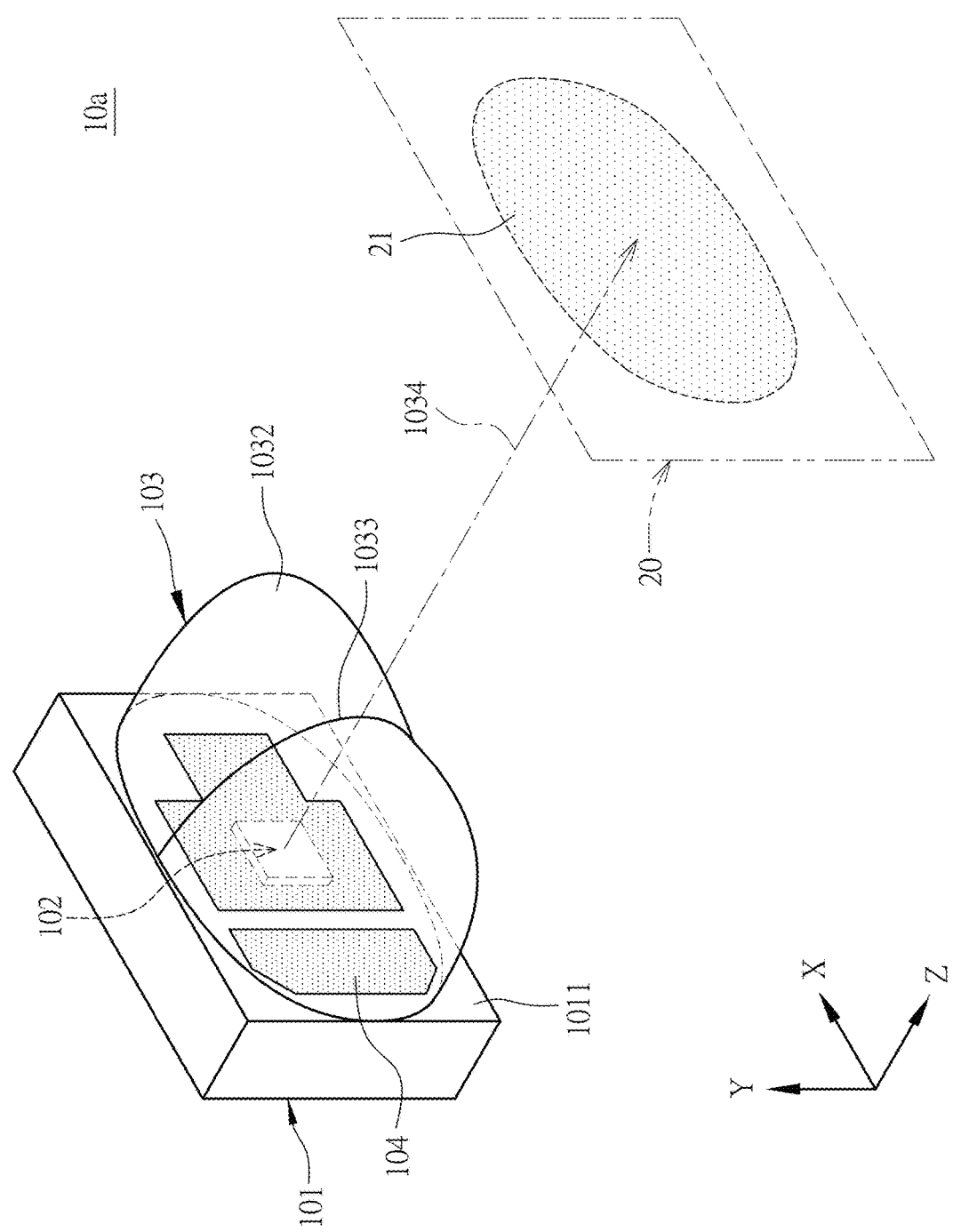
FIG. 1 is a perspective view showing a light-emitting diode according a first preferred embodiment of the present invention.

Referring to FIG. 1, a schematic view is provided to show a light-emitting diode according to a first preferred embodiment of the present invention. The light-emitting diode according to the instant embodiment, generally designated at 10a, comprises a substrate 101, a light-emitting diode chip 102, an optical lens 103, and a wiring layer 104. Specifically, the substrate 101 comprises an installation surface 1011 and the wiring layer 104 is formed on the installation surface 1011. The wiring layer 104 is made of a material that comprises a metal, such as gold, silver, copper, or a combination thereof, and is made of gold in the instant embodiment, which increases reflectivity by 5%~10%, wherein the installation surface 1011 is provided for mounting the light-emitting diode chip 102 thereon. In the instant embodiment, the substrate 101 can be but not limited to a metal substrate, a ceramic substrate, or a glass fiber substrate (for example, FR-4, FR-5, G-10, G-11, and so on), wherein the metal substrate is made of a material that is selected as one of copper, copper alloy, aluminum, aluminum alloy, magnesium alloy, aluminum silicon carbide, and carbon composition. The ceramic substrate is made of a material selected as one of aluminum oxide, aluminum nitride, zirconium oxide, silicon carbide, hexagonal boron nitride, and fluorinated carbon. Preferably, a heat sink (not shown) or a circuit board (not shown) is mounted on a surface of the substrate 101 that is opposite to the installation surface 1011 to dissipate heat from the light-emitting diode chip 102, wherein the heat sink can be formed through die casting, aluminum extruding, and stamping and the circuit board can be a glass fiber board, an aluminum substrate, or a copper substrate.

The light-emitting diode chip 102 has a shape that is square and has an optical axis 1034. In the instant embodiment, the number of the light-emitting diode chip 102 is one that generates visible light having white light color temperature between 2700K and 7000K, infrared light having a wavelength between 800 and 1000 nm (for example, infrared light having a wavelength between 790 and 830 nm with a peak value being 810 nm, infrared light having a wavelength between 830 and 870 nm with a peak value being 850 nm, or infrared light having a wavelength between 900 and 1000 nm with a peak value being 940 nm), ultraviolet light having a wavelength between 365 and 405 nm, or a laser beam having a wavelength between 800 and 1000 nm. In other words, specific examples of the light-emitting diode chip 102 may include a light-emitting diode that emits visible light, a light-emitting diode that emits invisible light (such as infrared light and ultraviolet light), and a laser semiconductor chip.

The optical lens 103 can be a curable sealer that is moisture resistant. The optical lens 103 is fixedly mounted on the installation surface 1011 of the substrate 101 to encapsulate the light-emitting diode chip 102. To reduce light refraction and loss, the light-emitting diode 10 of the present invention adopts a primary optical design, meaning the optical lens 103 is integrally formed on the installation surface 1011 of the substrate 101 through overmolding and set in tight engagement with the light-emitting diode chip 102. The overmolding of the method injects the material of the optical lens 103 into a chamber of a die first, inserts the light-emitting diode chip 102 mounted on the installation surface 1011, heats the material of the optical lens 103 directly such that it is curable and then takes it out from the chamber of the die to shape. Alternatively, after the light-emitting diode chip 102 is mounted on the installation surface 1011, deposing into the die, combining a top of the die and a bottom of the die by the hydraulic machine and vacuuming the die, deposing the material of the optical lens 103 on an entrance of the injecting channel, applying a pressure to the material of the optical lens 103 to enter every forming grooves along the injecting channel and heating the material of the optical lens 103 to be curable and takes it out from the chamber of the die to shape. By the method, the optical lens 103 has no air gap (i.e. single refractivity) with respect to the substrate 101 and the light-emitting diode chip 102. In other words, the optical lens 103 and the light-emitting diode chip 102 are not bonded to each other with adhesive so that the manufacturing process is simplified to greatly reduce cost and shorten fabrication time and also to prevent the issue of positional shift of the optical elements and lighting module during an assembly process and the gap between the optical element and the lighting module may generate more surface reflection or refraction so as to reduce the total amount of light that can be extracted.

In the instant embodiment, the curable sealer can be selected from one of a transparent material having a refractive index of 1.4~1.6, preferably 1.5, such as epoxy resin, acrylic resin, silicon resin, and silicone, but not limited thereto.

Further, the optical lens 103 has a light exit surface 1032. With a large width extension direction of the light exit surface 1032 defined as an X-axis direction, a small width extension direction of the light exit surface 1032 defined as a Y-axis direction, where the X-axis direction and the Y-axis direction are perpendicular, and a direction perpendicular to the installation surface 1011 defined as a Z-axis direction, then the light exit surface 1032 protrudes from the installation surface 1011 in the Z-axis direction.

Further, the light exit surface 1032 is formed of at least two curved surfaces 1033 having different curvatures. As such, the light exit surface 1032 of the optical lens 103 may guide a light beam emitting from the light-emitting diode chip 102 to travel in a direction along the optical axis 1034 to project onto a light receiving plane 20 and also form a non-symmetric light shape 21. It is noted that the non-symmetric light shape 21 has a shape that is approximately a rectangle or an ellipse. Preferably, the non-symmetric light shape 21 has an aspect ratio between 1.51 and 1.6. The term "aspect ratio" used herein refers to the ratio of a maximum cross-sectional dimension of the non-symmetric light shape with a maximum cross-sectional dimension perpendicular to the maximum cross-sectional dimension.

The optical lens 103 is asymmetric. The light exit surface 1032 of the optical lens 103 is selected from an aspheric surface, a cambered surface, a parabolic surface, a hyperbolic surface, and a free-form surface.

In a polar coordinate system, incident light I has a vector:

$I = (\sin \varphi_I \cos \theta i, \sin \varphi_I \sin \theta j, \cos \varphi_I k)$ Further, according to Snell's law, when light wave propagates from one medium to another medium, if the two media have different refractive indexes, then reflection may occur. Thus, a regular secondary optical design ($\varphi_I''$) is as follows:

$\varphi_I = \varphi s - \alpha 1 + \alpha 2 = \varphi_I''$ while the primary optical design ($\varphi_I'$) involves propagation among two or more different media, so that $\varphi_I' = \varphi s$ and $\varphi_I' > \varphi_I''$.

Further, according to the following luminous flux formula $$\Phi_{LED} = 2\pi \times \left\{ \int_{\varphi_o}^{\varphi_o + \frac{d\varphi}{2}} I(I(\varphi_o)) \sin\varphi d\varphi + \sum_{n=1}^{N-1} \int_{\varphi_n - \frac{d\varphi}{2}}^{\varphi_n + \frac{d\varphi}{2}} I(I(\varphi_n)) \sin\varphi d\varphi + \int_{\varphi_N - \frac{d\varphi}{2}}^{\varphi_N} I(I(\varphi_N)) \sin\varphi d\varphi \right\}$$

It is known that when sin get larger, luminous flux gets larger and thus, when $\varphi_I = \varphi_I' = \varphi s$, sin $\varphi_I' >$ sin $\varphi_I''$. Thus, the optical energy of the non-symmetric light shape 21 generated by the primary optical design adopted in this invention is increased by 10%~20% as compared to the optical energy of the secondary optics.

Second Embodiment

Figure 2:
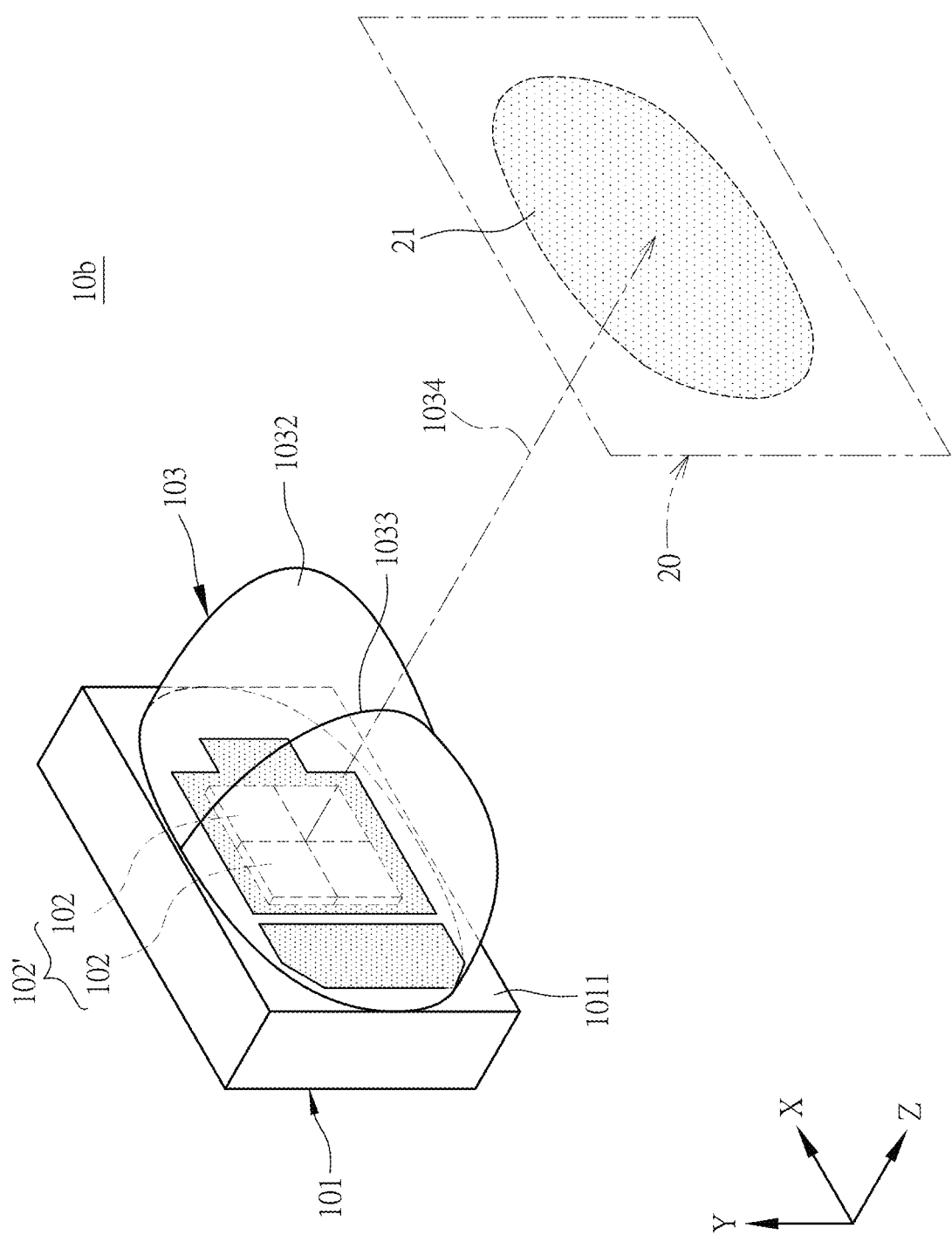
FIG. 2 is a perspective view showing a light-emitting diode according a second preferred embodiment of the present invention.

Referring to FIG. 2, a perspective view is given to illustrate a light-emitting diode according to a second preferred embodiment of the present invention. As shown in FIG. 2, the light-emitting diode of the instant embodiment, generally designated at 10b, comprises a substrate 101, at least one light-emitting diode chip 102, an optical lens 103, and a wiring layer 104. The instant embodiment is different from the first embodiment in that the number of the light-emitting diode chip 102 involved is plural and the plural light-emitting diode chips 102 are arranged in a square light emission array 102' and the plural light-emitting diode chips 102 are arranged tightly close to each other. As shown in FIG. 2, an illumination module 10b comprises four light-emitting diode chips 102, which are arranged in a square light emission array 102' with every two light-emitting diode chips 102 in a row. Preferably, the light-emitting diode chips 102 are arranged such that a spacing distance therebetween is between 0.0508 mm and 0.10616 mm in order to prevent the light-emitting diode chips 102 from colliding each other during encapsulation due to excessively small spacing distance therebetween and thus maintaining a desired light shape of the light-emitting diode 10b.

Although in the light-emitting diode 10b illustrated in FIG. 2, a square light emission array 102' is provided by including four light-emitting diode chips 102, in other examples of the instant embodiment, the square light emission array 102' may be formed of nine light-emitting diode chips 102 with every three arranged in a row, and the likes. Thus, the number of light-emitting diode chips 102 shown in FIG. 2 is provided as an example for illustration and reference and is not intended to limit the scope of the present invention.

Figure 3A:
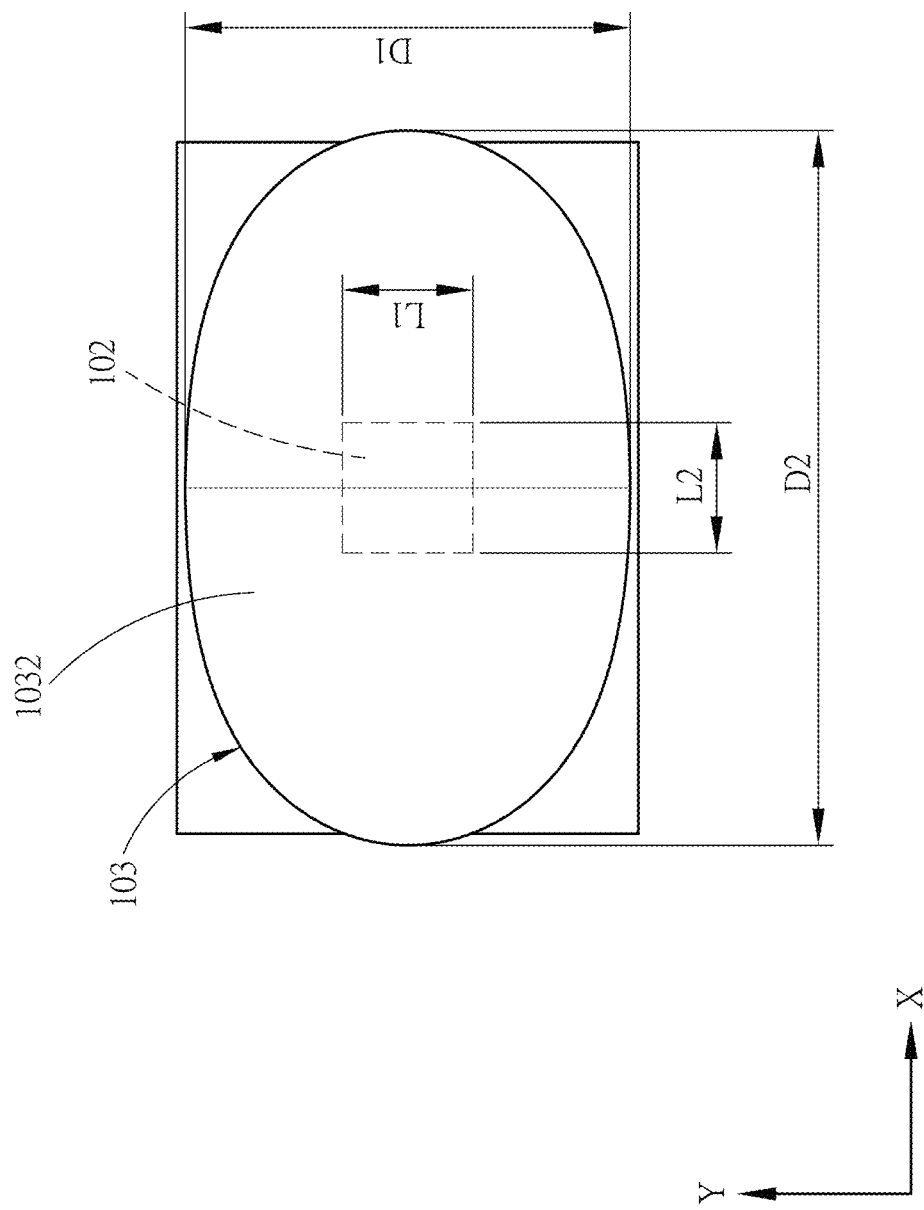
FIG. 3a is a top plan view showing the light-emitting diode according the first preferred embodiment of the present invention.

Further referring to FIG. 3a, a top plan view is given to illustrate the light-emitting diode according to the first embodiment of the present invention. The optical lens 103 satisfies the following condition 1:

$$0.3 < D1/D2 \leq 3 \qquad \text{[condition 1]}$$

wherein D1 is the widthwise distance between two outermost side edges of the light exit surface 1032 along the Y-axis, and D2 is the lengthwise distance between two opposite ends of the light exit surface 1032 along the X-axis.

Further, the optical lens 103 and the light-emitting diode chips 102 satisfy the following condition 2:

$$0.1 \leq L1/D1 \leq 0.5; 0.1 \leq L2/D2 \leq 0.5 \qquad \text{[condition 2]}$$

wherein D1 is the widthwise distance between two outermost side edges of the light exit surface 1032 along the Y-axis; D2 is the lengthwise distance between two opposite ends of the light exit surface 1032 along the X-axis; L1 is a widthwise distance of the light-emitting diode chips 102 along the Y-axis; and L2 is a lengthwise distance of the light-emitting diode chips 102 along the X-axis.

Figure 3B:
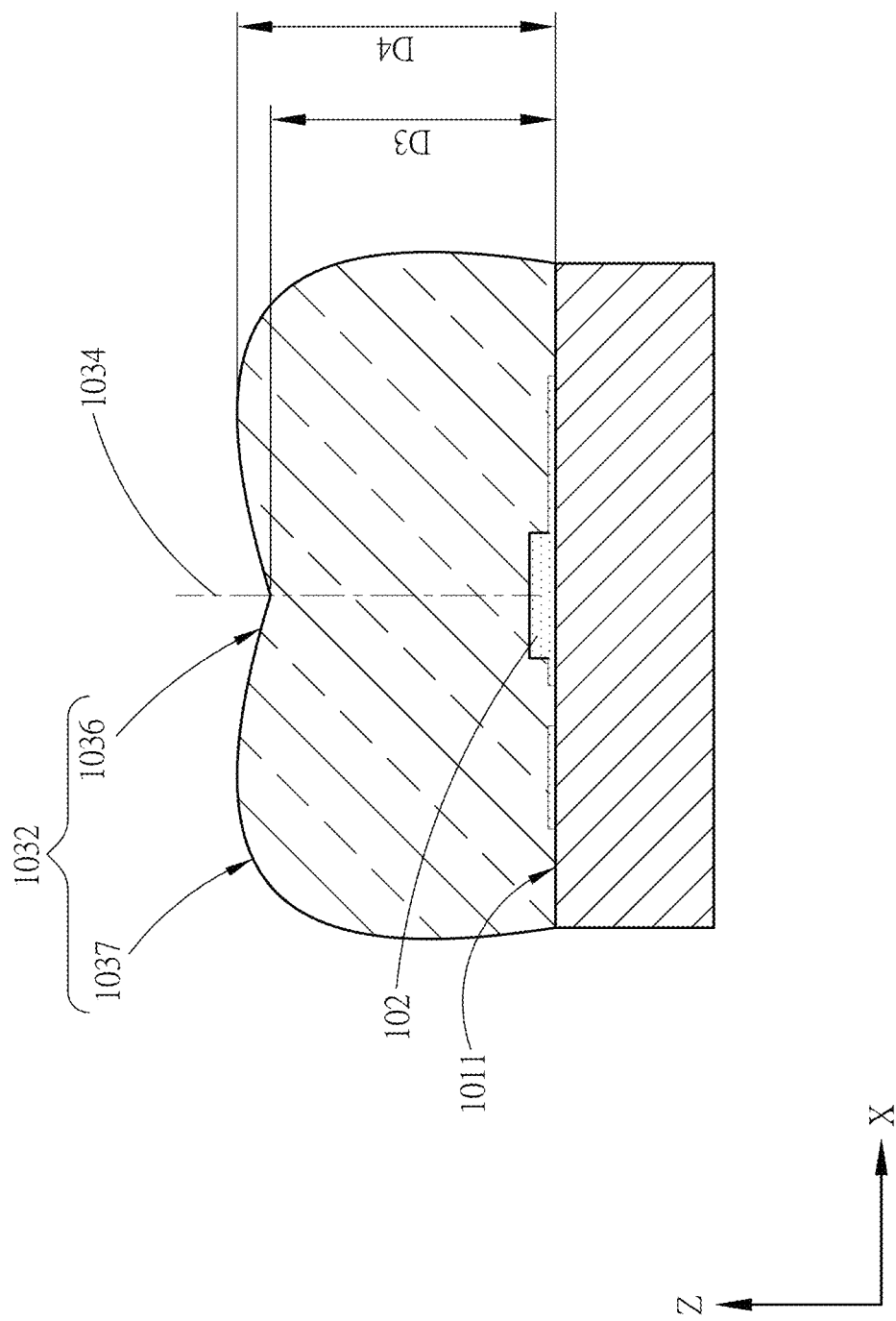
FIG. 3b is a cross-sectional view showing the light-emitting diode according the first preferred embodiment of the present invention.

Further referring to FIG. 3b, a cross-sectional view is given to illustrate the light-emitting diode according to the first embodiment of the present invention, wherein FIG. 3b is a view of a cross-section passing through the optical axis 1034 and extending toward opposite ends in the X-axis directions. The light exit surface 1032 is formed of a divergent surface 1036 and a convergent surface 1037, and a middle portion of the light exit surface 1032 is the divergent surface 1036, while two outer end portions of the divergent surface 1036 are the convergent surface 1037. The convergent surface 1037 is generally of mirror symmetry. Further, the divergent surface 1036 is provided for diverging a light beam around the optical axis 1034 and is thus preferably a concave curved surface of a negative diopter design, while the convergent surface 1037 is provided for converging a large angle light beam and is thus preferably a convex curved surface of a positive diopter design. The term "diopter" as used herein refers to the power of an optical system for converging light or diverging light and D=(n'/S')−(n/S)=n'/f'=n/f, where S' denotes image distance, S denotes object distance, n' is image space refractive index, n is object space refractive index, f' is image space focus length, and f is object space focus length. Accordingly, the light exit surface 1032 is shaped as being raised at the two end portions and recessed at the middle portion, along the X-axis, such that the contour is approximately an M-shape or is exactly an M-shape. Further, the optical lens 103 also satisfies the following condition 3:

$$0.65 < D3/D4 < 1 \qquad \text{[condition 3]}$$

wherein D3 is a distance from the installation surface 1011 to a lowest surface of the divergent surface 1036 in a direction along the optical axis 1034, and D4 is a distance from the installation surface 1011 to a highest surface of the convergent surface 1037 in a direction along the optical axis 1034.

Figure 3C:
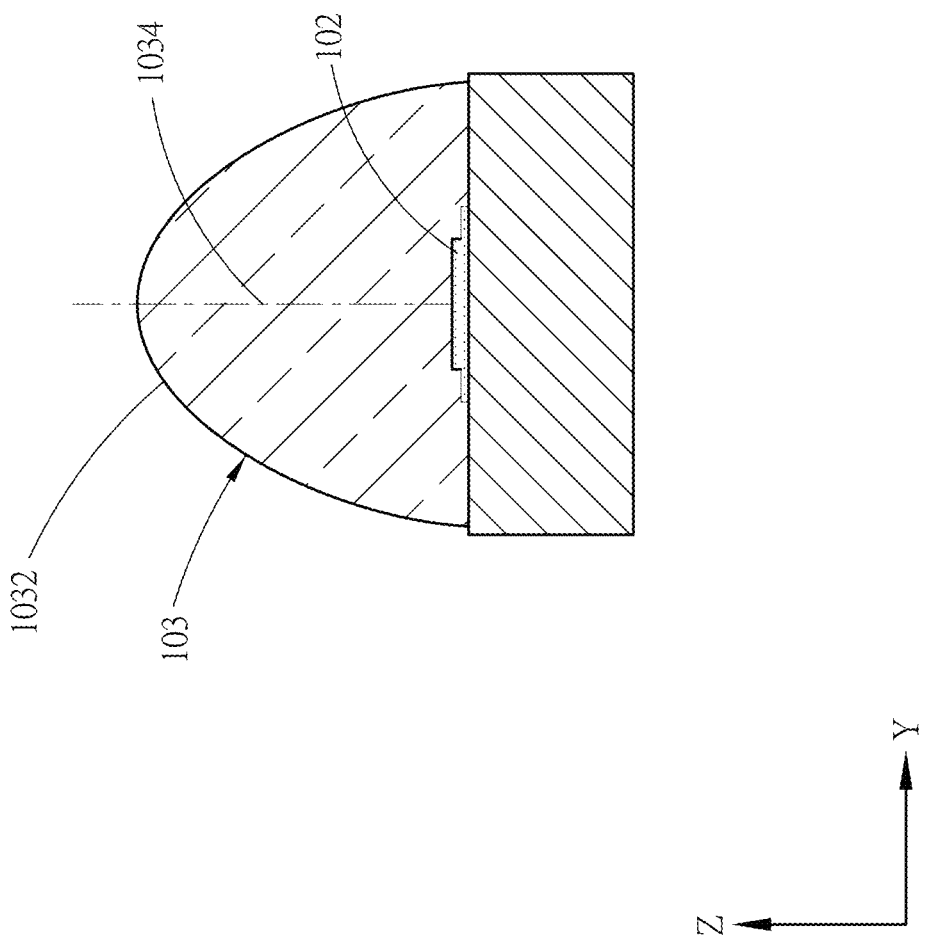
FIG. 3c is another cross-sectional view showing the light-emitting diode according the first preferred embodiment of the present invention.

Further referring to FIG. 3c, another cross-sectional view is given to illustrate the light-emitting diode according to the first embodiment of the present invention. FIG. 3c is a view of a cross-section extending in a direction normal to and perpendicular to the X-axis direction. The light exit surface 1032 is convex toward the optical axis 1034 at the middle thereof, and the contours extending toward two opposite ends in the Y-axis direction are approximately an arch shape, but not limited thereto. For example, the contours extending to the two opposite ends in the Y-axis direction may be of an M-shape. Thus, in the instant embodiment, the light exit 1032 of the optical lens 103 is made in an optical design that satisfies the above conditions so as to reduce total internal reflection of light to thereby effectively direct the light beam emitting from the light-emitting diode chips 102 toward the light receiving plane 20 to form a non-symmetric light shape 21 having high homogeneity and thus improve overall illumination and homogeneity, and compared to the secondary optical devices, in addition to an effect of miniaturization, the present invention allows the optical energy of the non-symmetric light shape 21 to increase by 10%~20% compared to the optical energy of the secondary optics. Further, under the condition of enlarging or reducing the optical lens 103 in a proportional way or the specification of the light-emitting diode chips 102 is varied, the present invention still allows for direct emission of non-symmetric light shape 21 and keeping the non-symmetric light shape at a constant aspect ratio.

Third Embodiment

Figure 4:
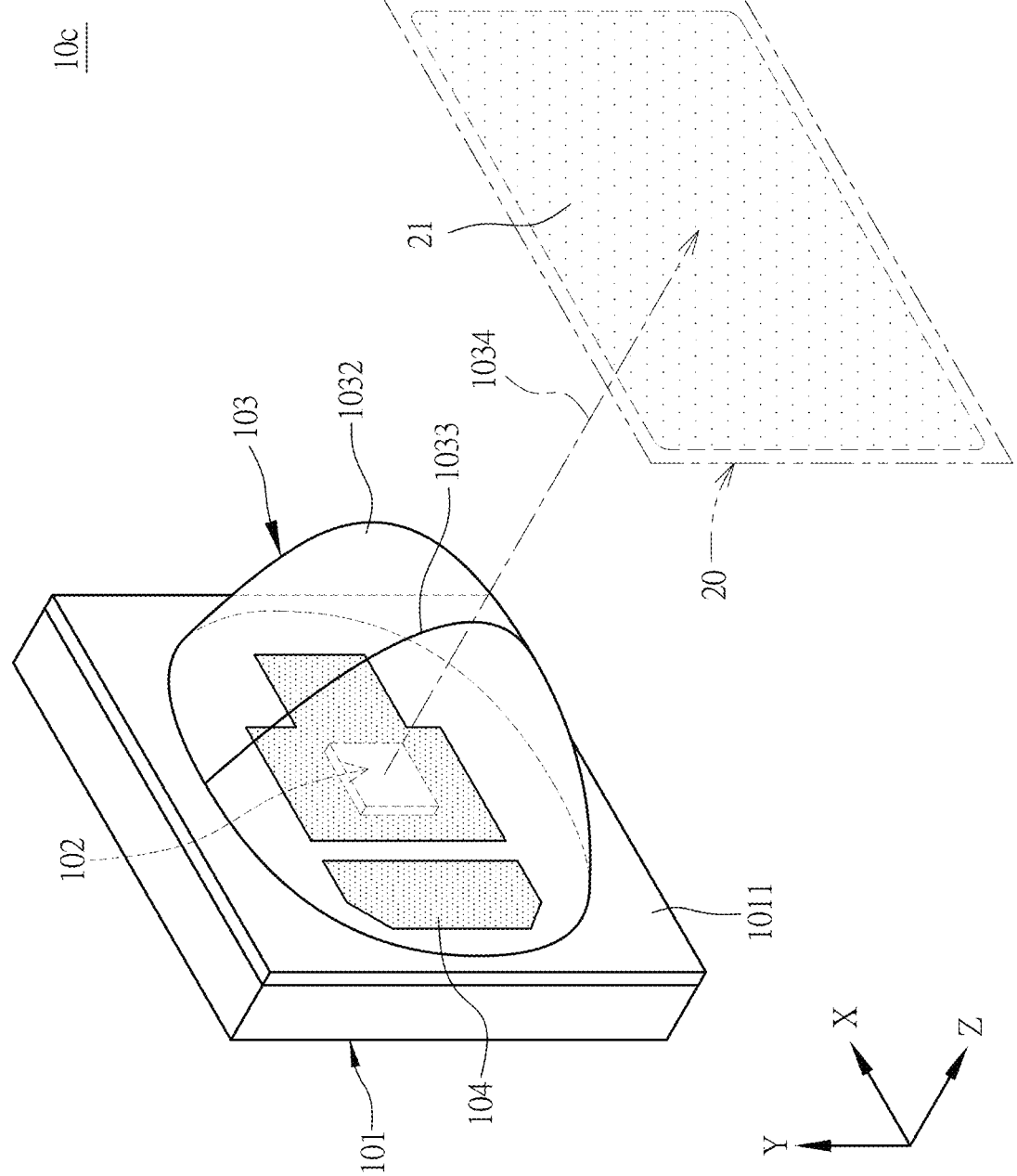
FIG. 4 is a perspective view showing a light-emitting diode according a third preferred embodiment of the present invention.

Referring to FIG. 4, a schematic view is provided to show a light-emitting diode according to a third preferred embodiment of the present invention. The instant embodiment is applicable to an indoor security surveillance system. Additional reference being had to FIGS. 3a-3c, as shown in the drawings, the light-emitting diode, generally designated at 10c, comprises a substrate 101, a light-emitting diode chip 102, an optical lens 103, and a wiring layer 104. Specifically, the substrate 101 comprises an installation surface 1011 and the wiring layer 104 is formed on the installation surface 1011. The wiring layer 104 is made of a material that comprises a metal, such as gold, silver, copper, or a combination thereof, and in the instant embodiment, the wiring layer is made of gold t, which increases reflectivity by 5%~10%. The light-emitting diode chip 102 has a shape that is square and may generate infrared light having a wavelength between 750 and 1000 nm (for example, infrared light having a wavelength between 790 and 830 nm with a peak value being 810 nm, infrared light having a wavelength between 830 and 870 nm with a peak value being 850 nm, or infrared light having a wavelength between 900 and 1000 nm with a peak value being 940 nm). In the instant embodiment, the size of the light-emitting diode chip 102 is 20 mil., and may not be limited thereto and may be or example one of 30, 42, and 45 mil. The optical lens 103 is shaped to include a light exit surface 1032. With a large width extension direction of the light exit surface 1032 defined as an X-axis direction, a small width extension direction of the light exit surface 1032 defined as a Y-axis direction, where the X-axis direction and the Y-axis direction are perpendicular, and a direction perpendicular to the installation surface 1011 defined as a Z-axis direction, then the light exit surface 1032 protrudes from the installation surface 1011 in the Z-axis direction. The light exit surface 1032 is formed of at least two curved surfaces 1033 of different curvatures. In the instant embodiment, the light exit surface 1032 of the optical lens 103 is a free-form surface, wherein D1 is approximately 3.0 mm, D2 is approximately 3.2 mm, D3 is approximately 1.53 mm, D4 is approximately 1.54 mm, and L1=L2=0.508 mm. Inserting these data into the conditions provided above in association with FIGS. 3a-3c provides the following conditions:

$D1/D2=0.9375$ [condition 1]

$L1/D1=0.1693; L2/D2=0.15875$ [condition 2]

$D3/D4=0.99$ [condition 3]

Further, the divergent surface 1036 of the light exit surface 1032 has a diopter value of −1500, while the convergent surface 1037 has a diopter value of 100. Thus, based on the above conditions, the light exit surface 1032 of the optical lens 103 may direct a light beam emitting from the light-emitting diode chip 102 to travel in a direction along the optical axis 103 and to project to a light receiving plane 20 through light refraction caused by the divergent surface 1036 and the convergent surface 1037 so as to form a non-symmetric light shape 21 projected onto the light receiving plane 20. The non-symmetric light shape 21 has a configuration that is roughly a rectangle or an ellipse. Preferably, the non-symmetric light shape 21 has an aspect ratio between 1.51 and 1.6 in order to satisfy the ratio of image information acquired by a camera. The term "aspect ratio" used herein refers to the ratio of a maximum cross-sectional dimension of the non-symmetric light shape with a maximum cross-sectional dimension perpendicular to the maximum cross-sectional dimension.

Figure 5A:
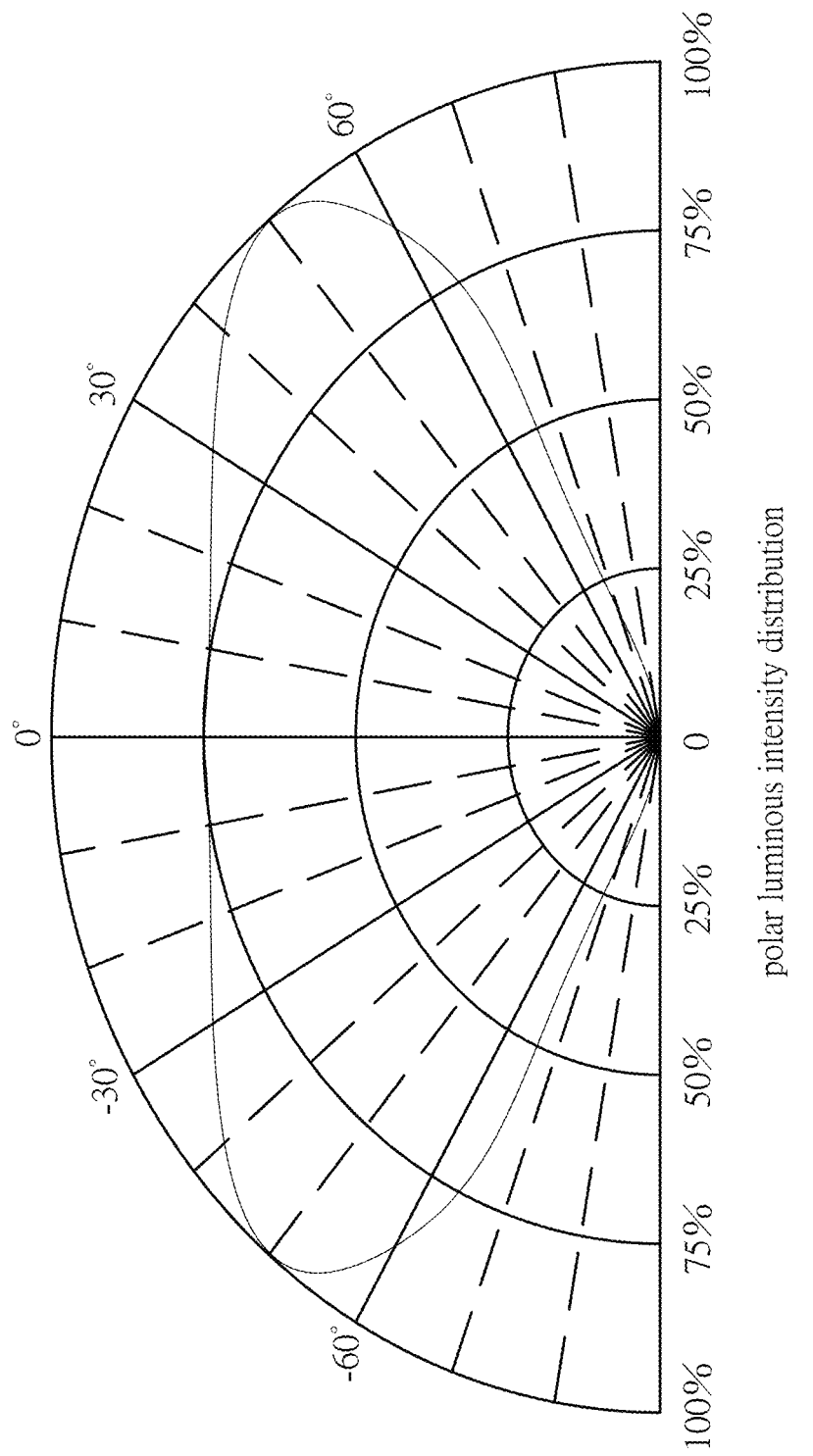
FIG. 5a is a polar luminous intensity distribution diagram of the light-emitting diode according the third embodiment of the present invention.
Figure 5B:
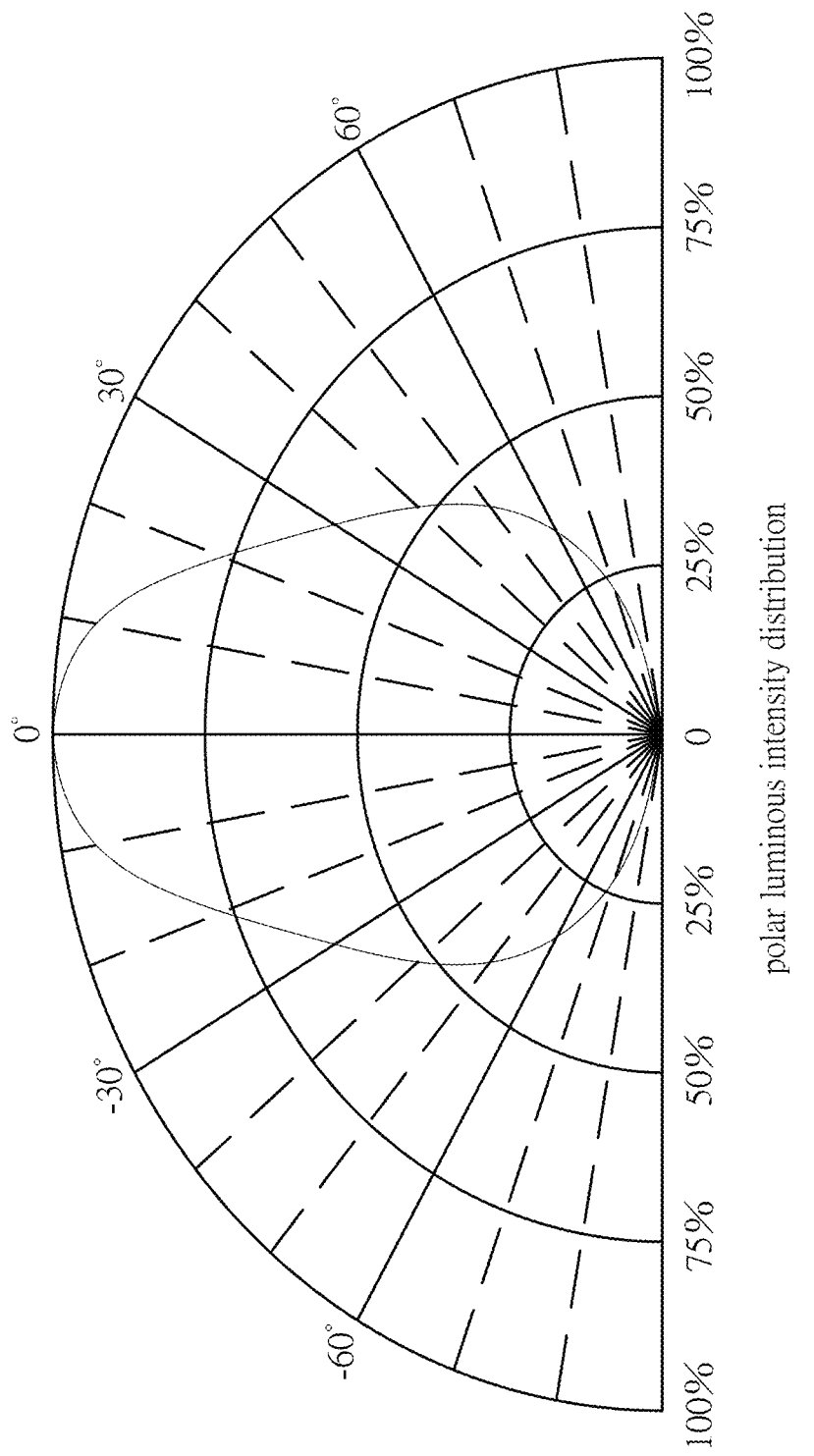
FIG. 5b is another polar luminous intensity distribution diagram of the light-emitting diode according the third embodiment of the present invention.

Further referring to FIGS. 5a and 5b, which are polar luminous intensity distribution diagrams of the light-emitting diode according to the third embodiment of the present invention, in combination with FIG. 4, FIG. 5a is a polar luminous intensity distribution diagram on a plane passing through the optical axis 1034 and extending in the X-axis direction. When the light exit surface 1032 of the optical lens 103 is a free-form surface, with the optical lens 103 satisfying conditions 1-3, the diopter value of the divergent surface 1036 being −1500, and the diopter value of the convergent surface 1037 being 100, the light-emitting diode chip 102 is preferably used to generate infrared light having a wavelength between 830 and 870 nm with a peak value being 850 nm and a light distribution pattern being a bat-wing contour with a half-power (Full width at half maximum, FWHM) angle (which is a light angle that light intensive value is half of the intensive value of the axis direction) between 40 and 160 degrees, preferably 130 degrees. It can be known from the diagram that luminous intensity is not reducing from a central normal vector (0°) toward the peripheral edge and is in fact exhibited as being increase of illumination in the ranges of 0° to 50 and 0° to −50°. The maximum value of luminous intensity (Batwing peak) that the light-emitting diode 10c generates is at a location between around 40° and 60°, an optimum value being at 50°, the luminous intensity of the normal vector being 75% of the maximum luminous intensity, to thereby provide the best design of homogeneity. FIG. 5b is the polar luminous intensity distribution diagram on a plane passing through the optical axis 1034 and orthogonal and perpendicular to the X-axis direction. The light exit surface 1032 of the optical lens 103 is a free-form surface, and the light-emitting diode chip 102 is preferably used to generate infrared light having a wavelength between 830 and 870 nm with a peak value being 850 nm, and showing a light shape in a light concentration form, with a half-power view angle between 30 and 100 degrees, preferably 85 degrees, but not limited thereto. Thus, the superimposition of the light shapes of X-axis and Y-axis helps improve homogeneity of luminous distribution. The light exit surface 1032 of the present invention, through the above described optical design, allows the light-emitting diode 102 to generate a non-symmetric light shape 21 having more homogeneous distribution. The light shape 21 has a configuration that is approximately a rectangle or an ellipse and the non-symmetric light shape 21 has an aspect ratio that is around 1.53, falling within the range discussed above.

Figure 6A:
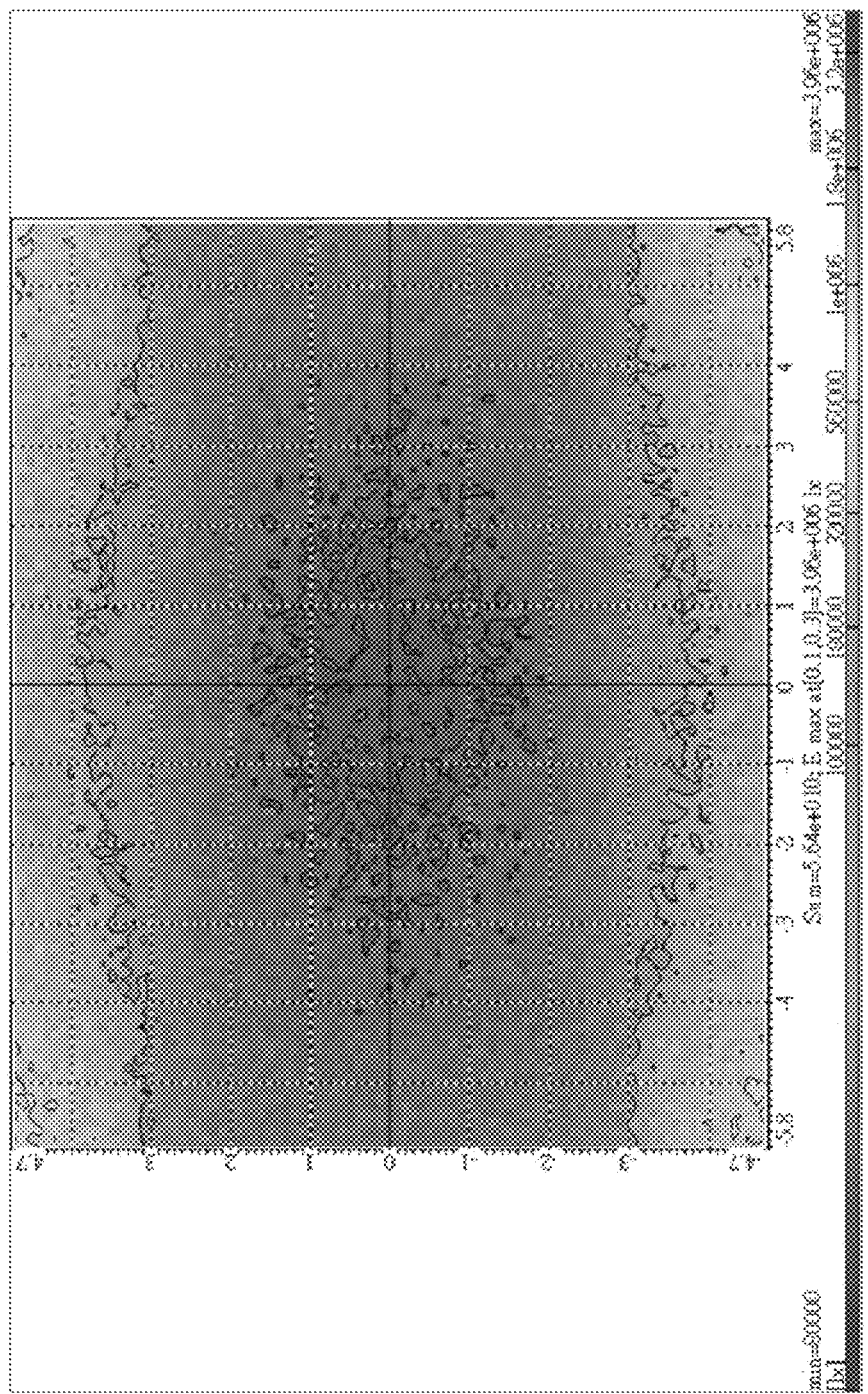
FIG. 6a is a plot illustrating homogeneity of a light exit surface of the third embodiment of the present invention.
Figure 6B:
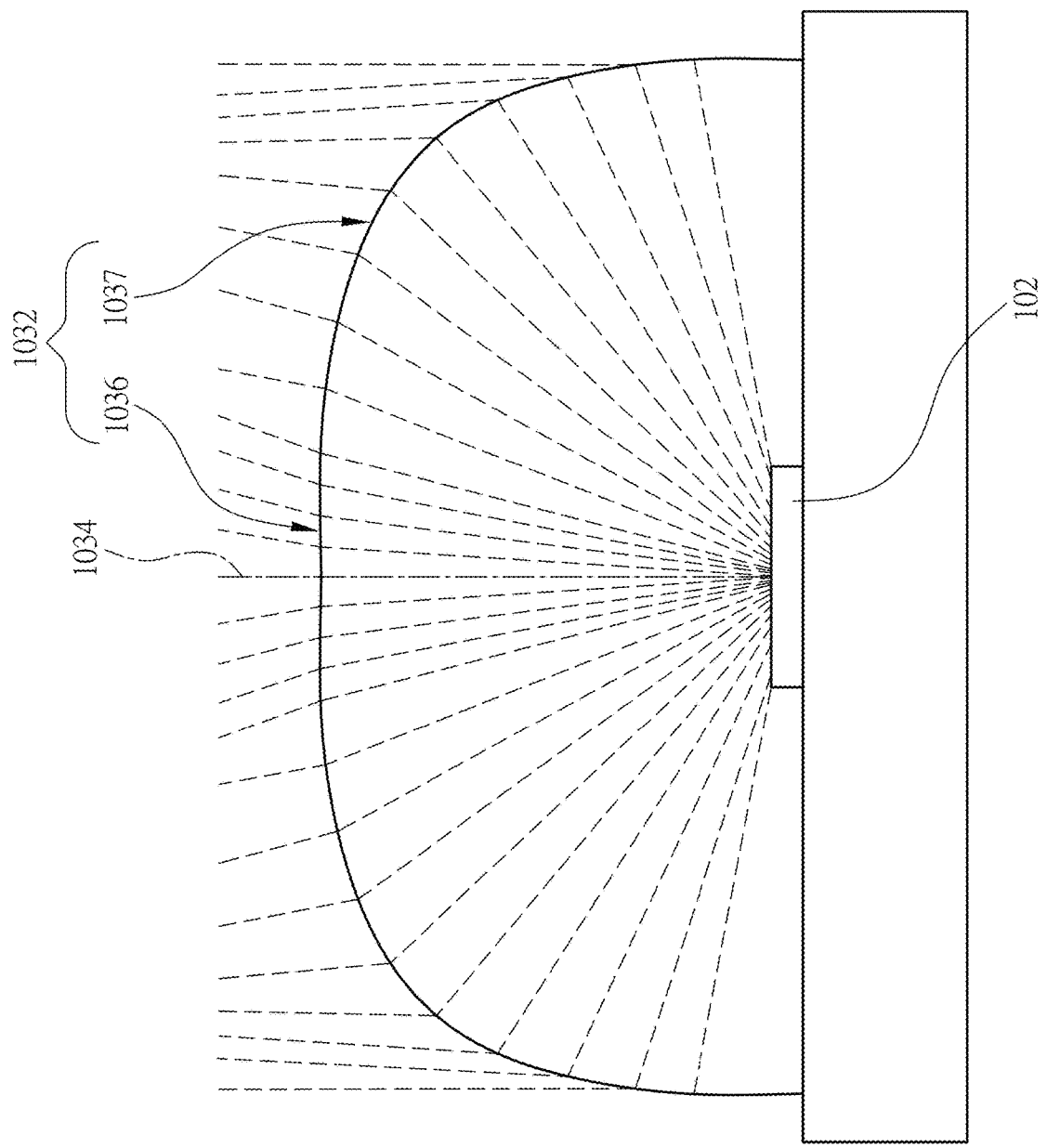
FIG. 6b is a schematic view illustrating a light exit ray of the third embodiment of the present invention.

Further referring to FIGS. 6a and 6b, an illuminance pattern of the light exit surface and a light exit ray of the third embodiment of the present invention is shown. As shown in the drawing, when the light exit surface 1032 of the optical lens 103 satisfies all the conditions and diopter values (the drawing shows the divergent surface 1036 has a diopter value of −1500, while the convergent surface 1037 has a diopter value of 100), a non-symmetric light shape 21 having homogeneity of 60% may be generated and the non-symmetric light shape 21 has a configuration that is roughly a rectangle.

Figure 16A:
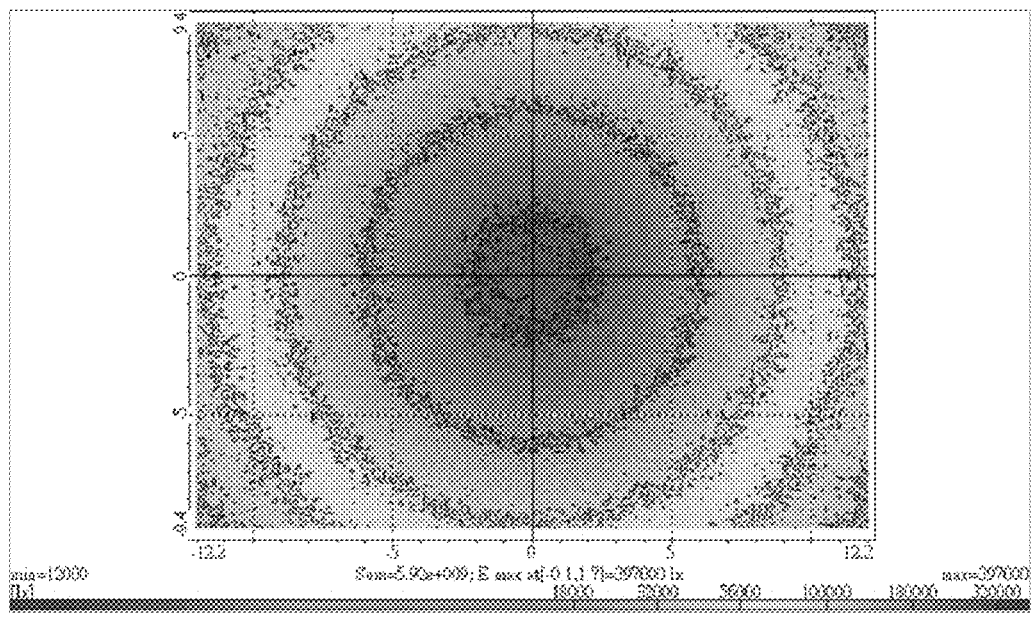
FIGS. 16a to 16d are a variety of the half-power view angles of the circular-symmetry light shape of the light receiving plane homogeneity diagrams generated by a conventional surveillance camera device.
Figure 16B:
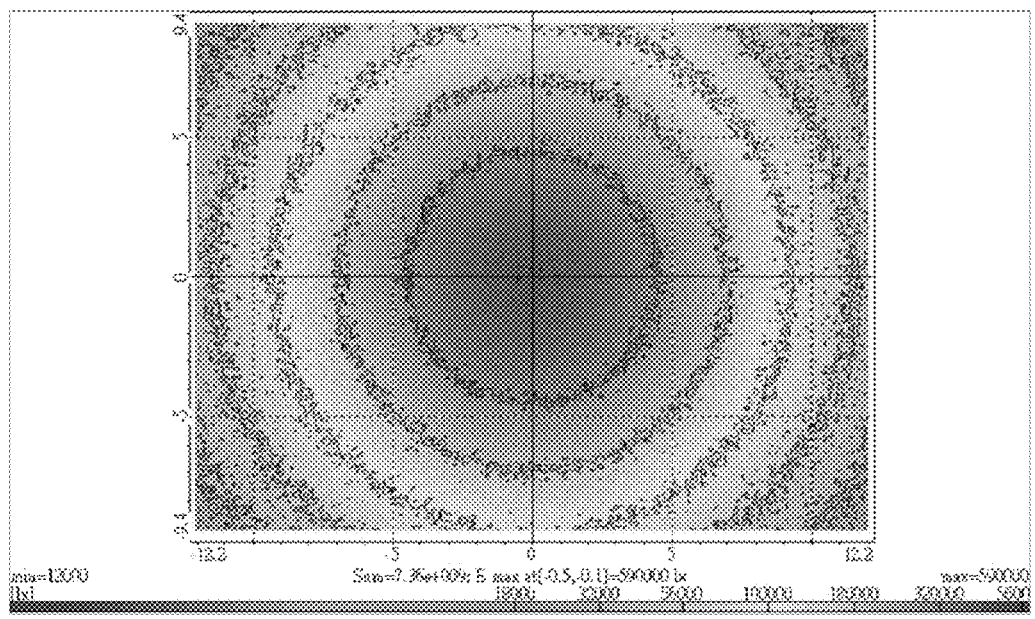
Figure 16C:
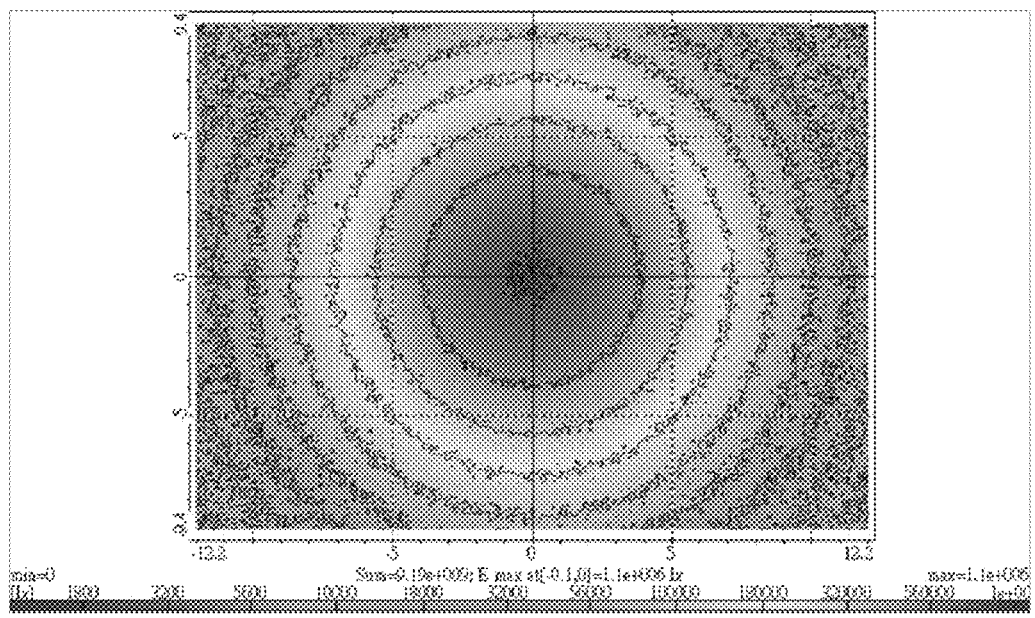
Figure 16D:
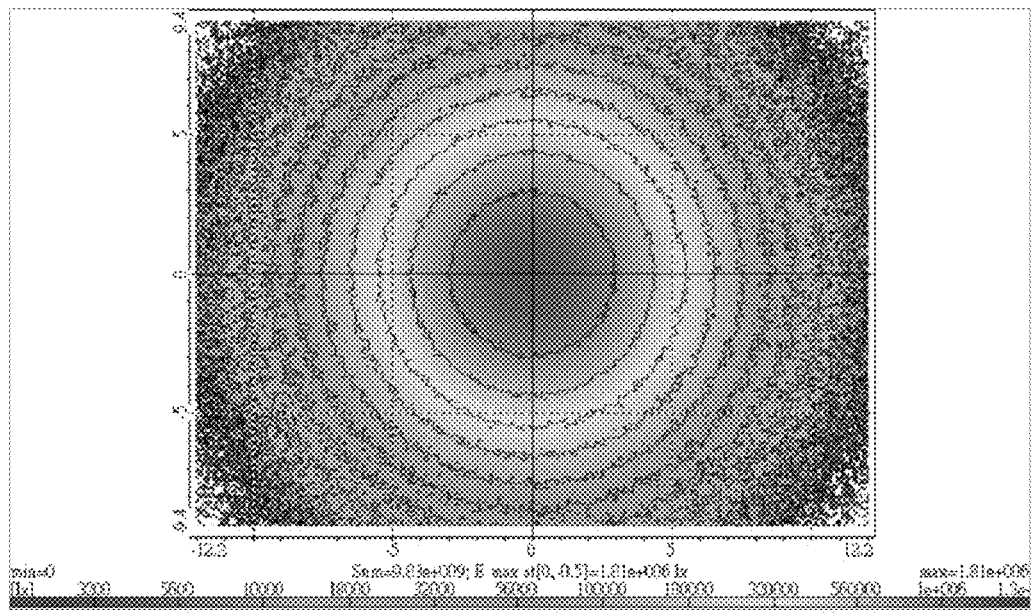

In the detail in contrast with the prior art, an example as FIG. 16a, if a rectangular light shape of the embodiment needs to be shown, the rectangular opening needs to be deposed on the lens mechanism of the camera device so as to the photographed image is trimmed by the rectangular opening. That is, the horizontal axis and the vertical axis of FIG. 16a are separately trimmed at the position, ±5.8 and ±4.7. The method not only loses more light energy, but also decreases coverage; therefore, the image of the photographed object is trimmed by the rectangular opening, which causes the distortion of the parts of image.

Fourth Embodiment

Figure 7:
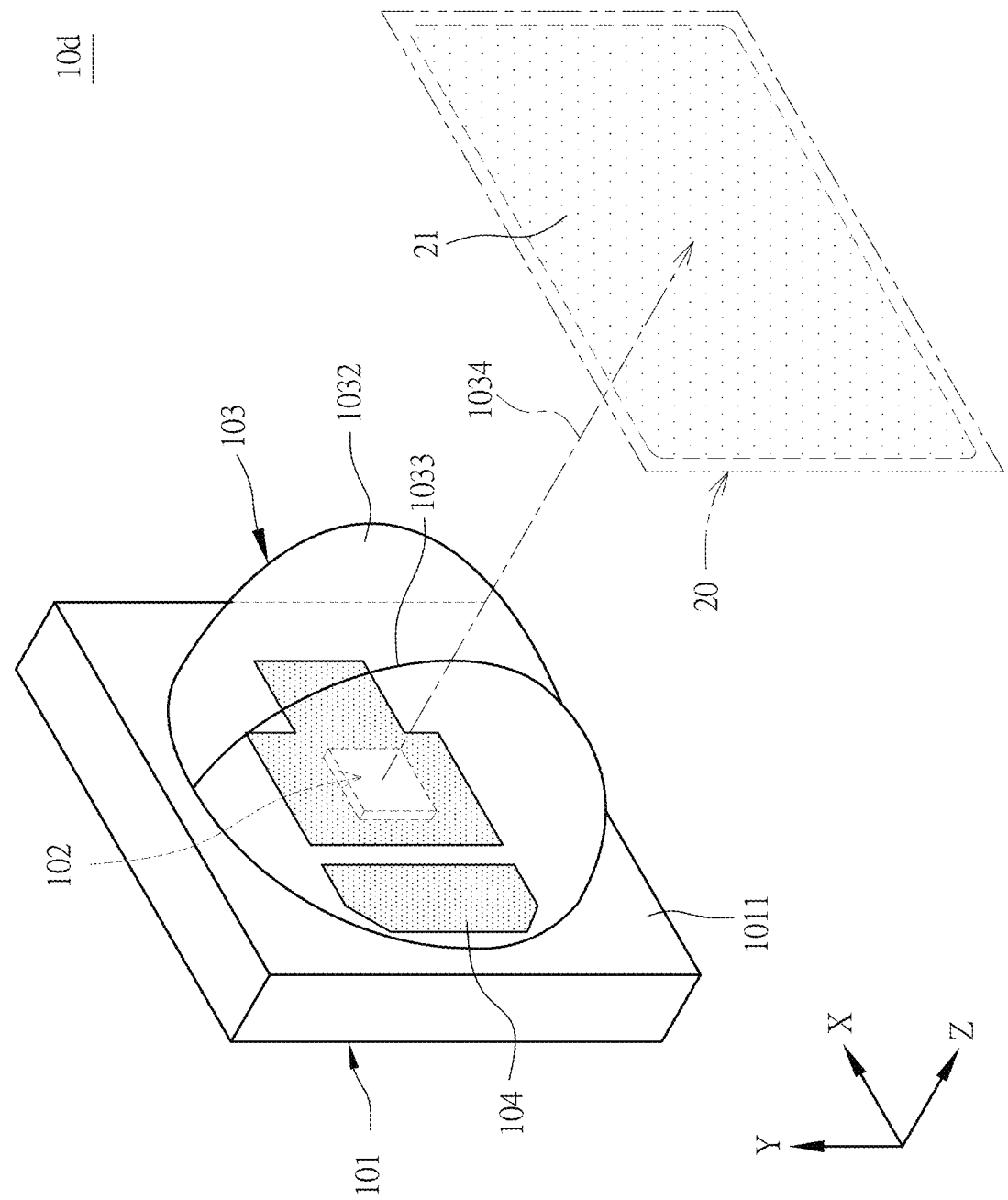
FIG. 7 is a perspective view showing a light-emitting diode according a fourth preferred embodiment of the present invention.

Referring to FIG. 7, a schematic view is provided to show a light-emitting diode according to a fourth preferred embodiment of the present invention. The instant embodiment is applicable to an outdoor security surveillance system. Additional reference being had to FIGS. 3a-3c, the instant embodiment is different from the third embodiment in that the optical lens 30 of the instant embodiment has a light exit surface 1032 that is an aspheric surface, wherein D1 is approximately 3.0 mm, D2 is approximately 3.0 mm, D3 is approximately 2.2 mm, D4 is approximately 2.5 mm, and L1=L2=0.508 mm. Inserting these data into the conditions provided above in association with FIGS. 3a-3c provides the following conditions:

$D1/D2=1$ [condition 1]

$L1/D1=0.1693; L2/D2=0.1693$ [condition 2]

$D3/D4=0.99$ [condition 3]

Further, the aspheric surface is represented in equation 1 as follows:

$$z = \frac{cr^2}{1+\sqrt{1-(1+k)c^2r^2}} + \sum_{i=1}^{n} a_i a^{2i}$$

where c denotes curvature, r indicates radius of curvature of an apex, and k indicate conic constant, and c=1/r and k<0.

In the instant embodiment, data are listed in the following Table 1, wherein the radius of curvature of apex (r), the conic constant (k), and aspheric coefficients of Nth orders (A4, A6, A8, A10, A12, A14, A16) are provided.

TABLE 1

| | |
|---|---|
| r | 9.03 |
| k | −0.522 |
| $A^4$ | $-1.872 \times 10^{-4}$ |
| $A^6$ | $5.099 \times 10^{-5}$ |
| $A^8$ | $-7.519 \times 10^{-6}$ |
| $A^{10}$ | $6.093 \times 10^{-7}$ |
| $A^{12}$ | $-2.766 \times 10^{-8}$ |
| $A^{14}$ | $6.591 \times 10^{-10}$ |
| $A^{16}$ | $-6.416 \times 10^{-12}$ |

Further, the divergent surface 1036 of the light exit surface 1032 has a diopter value of −500 and the convergent surface 1037 has a diopter value of 25. Thus, when the optical lens 103 satisfies the above conditions and Table 1, the light exit surface 1032 of the optical lens 103 may direct a light beam emitting from the light-emitting diode chip 102 to travel in a direction along the optical axis 1034 and to project to a light receiving plane 20 through light refraction caused by the divergent surface 1036 and the convergent surface 1037 so as to form a non-symmetric light shape 21. The non-symmetric light shape 21 has a configuration that is roughly a rectangle or an ellipse. Preferably, the non-symmetric light shape 21 has an aspect ratio between 1.51 and 1.6 in order to satisfy the ratio of image information acquired by a camera device. The term "aspect ratio" used herein refers to the ratio of a maximum cross-sectional dimension of the non-symmetric light shape with a maximum cross-sectional dimension perpendicular to the maximum cross-sectional dimension.

Figure 8A:
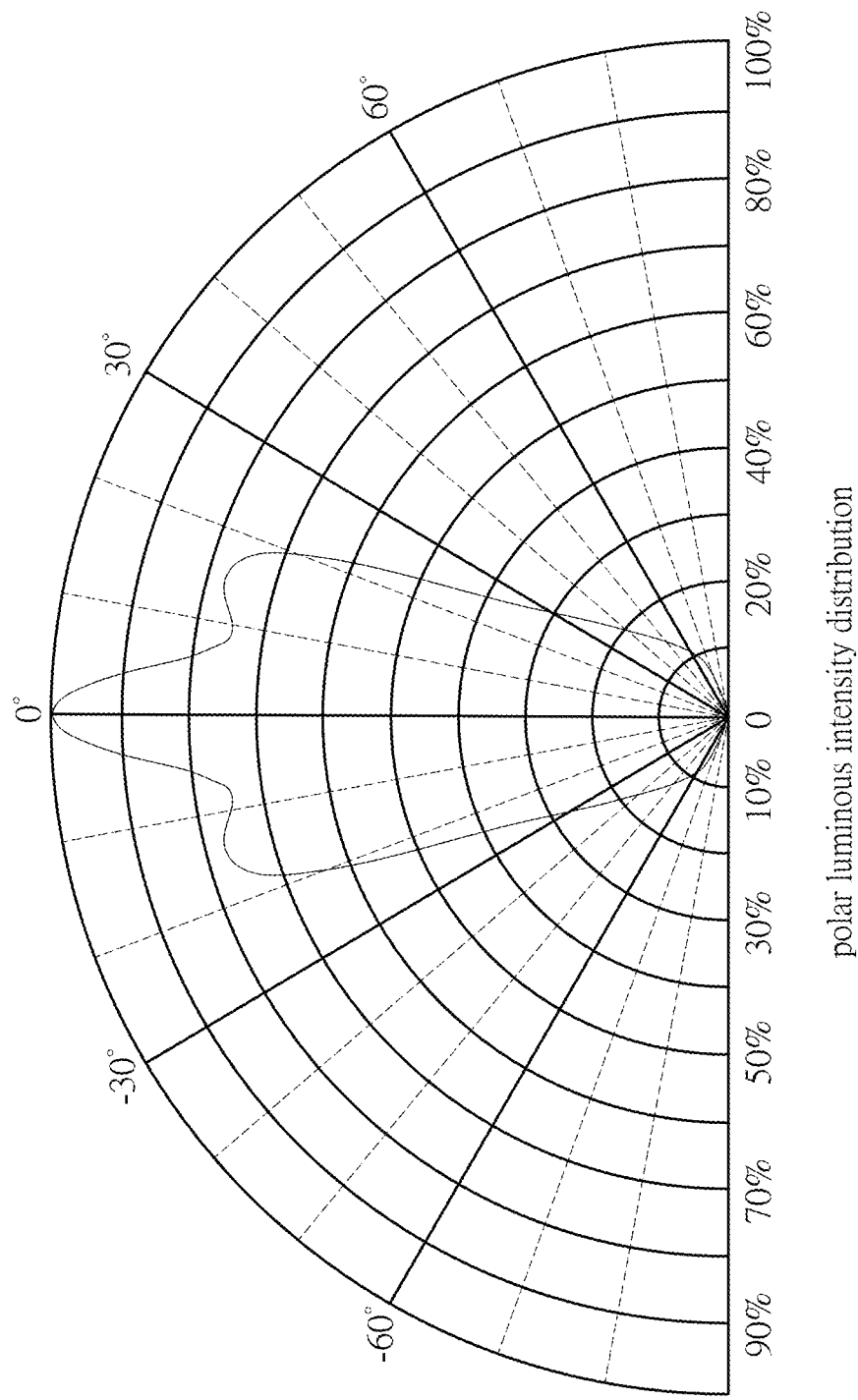
FIG. 8a is a polar luminous intensity distribution of the light-emitting diode according the fourth embodiment of the present invention.
Figure 8B:
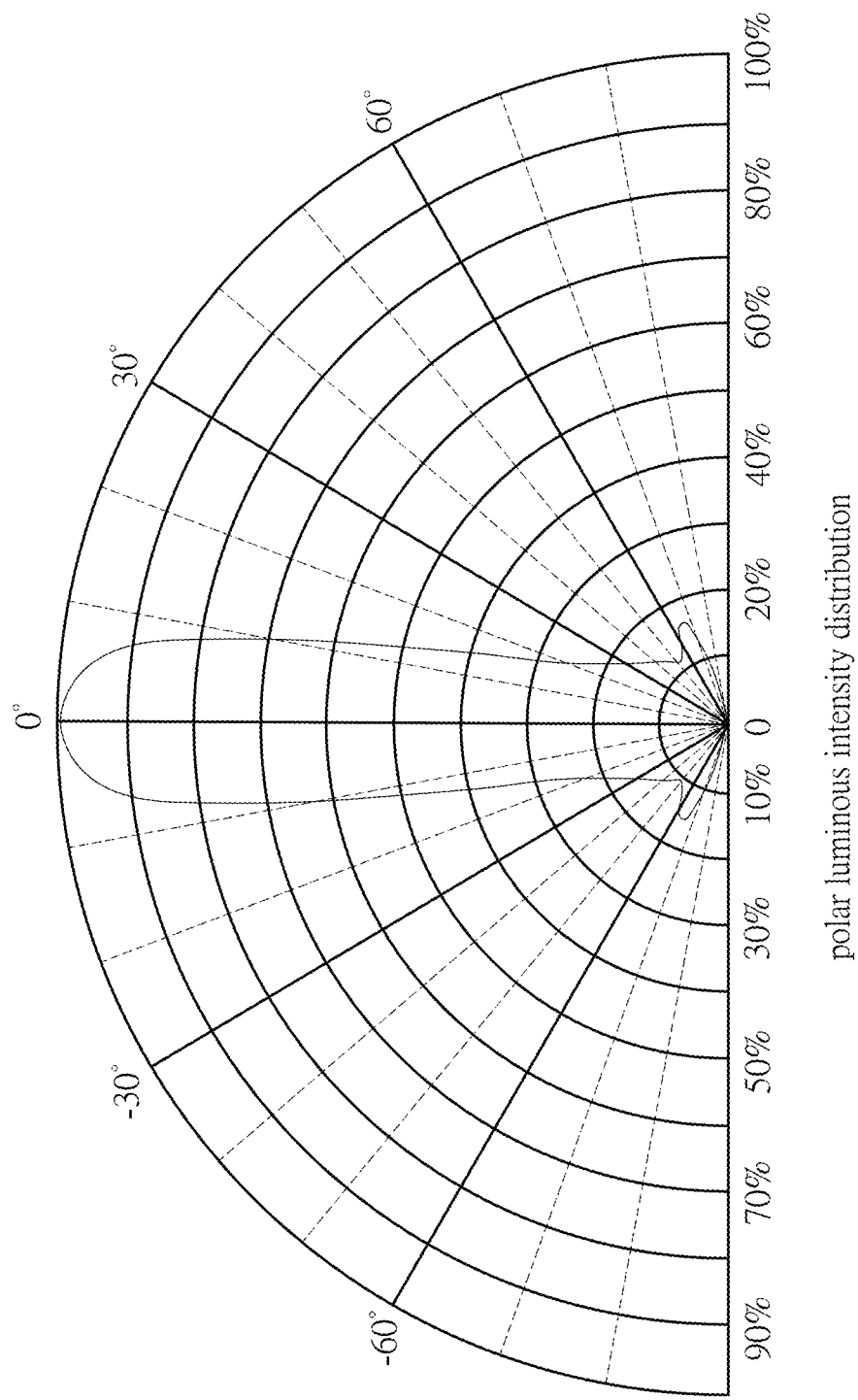
FIG. 8b is another polar luminous intensity distribution of the light-emitting diode according the fourth embodiment of the present invention.

Further referring to FIGS. 8a and 8b, which are polar luminous intensity distribution diagrams of the light-emitting diode according to the fourth embodiment of the present invention, in combination with FIG. 7, FIG. 8a is a polar luminous intensity distribution diagram on a plane passing through the optical axis and extending in the X-axis direction. When the optical lens 103 satisfies conditions 1-3 and the light exit surface 1032 is an aspheric surface having the data listed in Table 1, a half-power view angle (which is a light angle that light intensive value is half of the intensive value of the axis direction) of the light-emitting diode chip 102 is around 47 degrees, but not limited thereto. FIG. 8b is the polar luminous intensity distribution diagram on a plane passing through the optical axis 1034 and orthogonal and perpendicular to the X-axis direction. When the optical lens 103 satisfies conditions 1-3 and the light exit surface 1032 is an aspheric surface having the data listed in Table 1, a half-power view angle of the light-emitting diode chip 102 is around 31 degrees, but not limited thereto. Thus, the superimposition of the light shapes of X-axis and Y-axis helps improve homogeneity of luminous distribution. The above described design of the optical lens allows the light-emitting diode 102 to generate a non-symmetric light shape 21 having more homogeneous distribution. The light shape 21 has a configuration that is approximately a rectangle or an ellipse and the non-symmetric light shape 21 has an aspect ratio that is around 1.51, falling within the range discussed above.

Figure 9A:
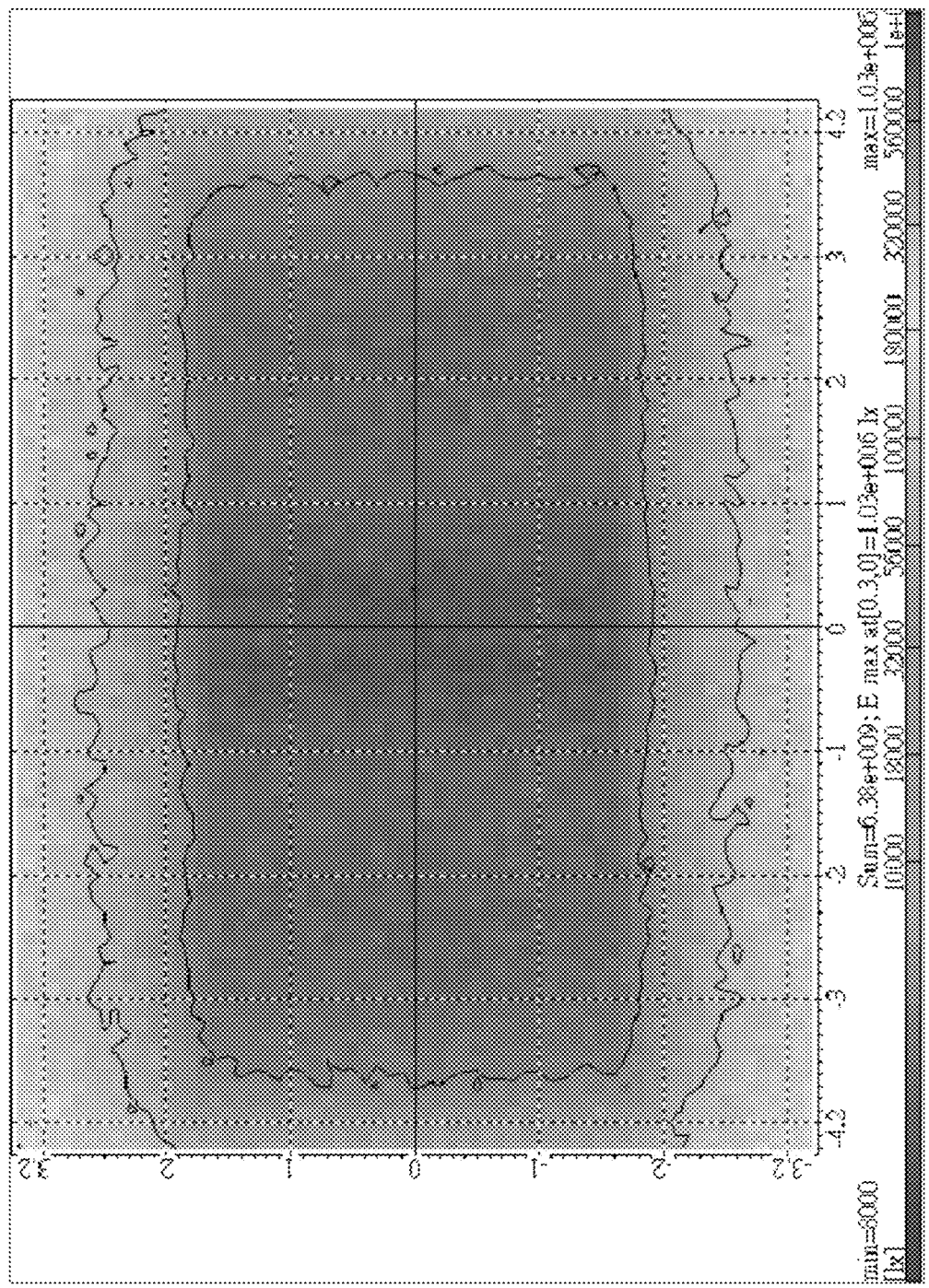
FIG. 9a is a plot illustrating homogeneity of a light exit surface of the fourth embodiment of the present invention.
Figure 9B:
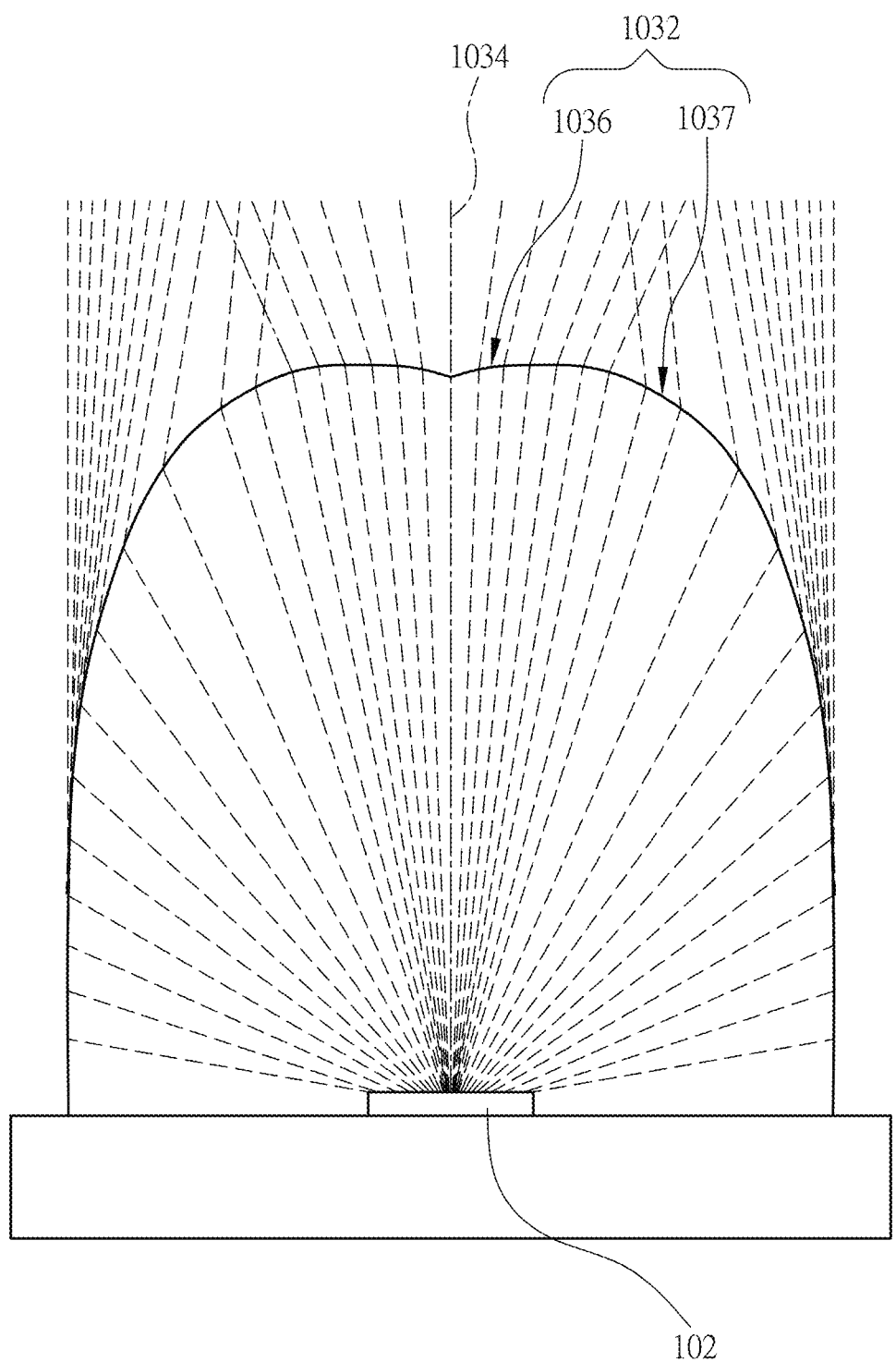
FIG. 9b is a schematic view illustrating a light exit ray of the fourth embodiment of the present invention.

Further referring to FIGS. 9a and 9b, an illuminance pattern of the light exit surface and a light exit ray of the fourth embodiment of the present invention is shown. As shown in the drawing, when the light exit surface 1032 of the optical lens 103 satisfies all the conditions and diopter values (the drawing shows the divergent surface 1036 has a diopter value of −500, while the convergent surface 1037 has a diopter value of 25), a non-symmetric light shape 21 having homogeneity of 60% may be generated and the non-symmetric light shape 21 has a configuration that is roughly a rectangle.

In the detail in contrast with the prior art, an example as FIG. 16a, if a rectangular light shape of the embodiment needs to be shown, the rectangle open needs to be deposed on the lens mechanism of the camera device so as to the photographed image is trimmed by the rectangle open. That is, the horizontal axle and the vertical axle of FIG. 16a are separately trimmed at the position, ±4.2 and ±3.2. The method not only loses more light energy, but also decreases coverage; therefore, the image of the photographed object is trimmed by the rectangle open, which causes the distortion of the parts of image.

Figure 10:
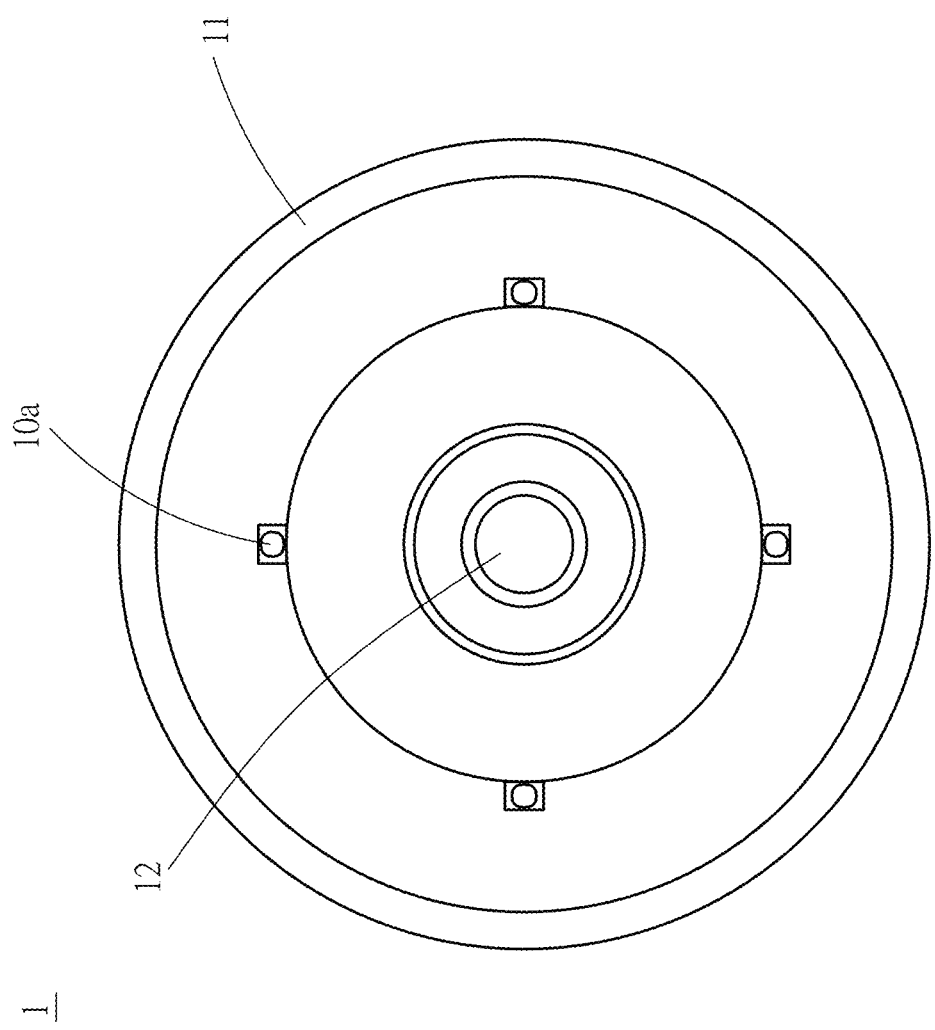
FIG. 10 is a schematic planar view illustrating a surveillance camera device according to the first embodiment of the present invention.

Referring to FIG. 10, which is a schematic planar view illustrating a surveillance camera device according to the first embodiment of the present invention, the surveillance camera device 1 of the instant embodiment comprises at least one light-emitting diode 10a, a casing 11, and an image capturing element 12. The casing 11 receives electronic circuit modules (not shown), such as an image sensor and a circuit board, mounted therein. The image capturing element 12 can be for example a fisheye lens. The image capturing element 12 is arranged in the casing 11 and partly projects out of the casing 11 to capture images. In the instant embodiment, the number of light-emitting diodes 10a being four is taken as an example, and the light-emitting diodes 10a are arranged on the casing 11 to circumferentially enclose the image capturing element 12 therein. Preferably, the light-emitting diodes 10a are arranged on the casing 11 in an angularly equally spaced manner to surround around the image capturing element 12, but not limited thereto. In other embodiments, the number of the lighting module 10a that generates a non-symmetric light shape can be just one and located at one side of the image capturing element 12.

Figure 11:
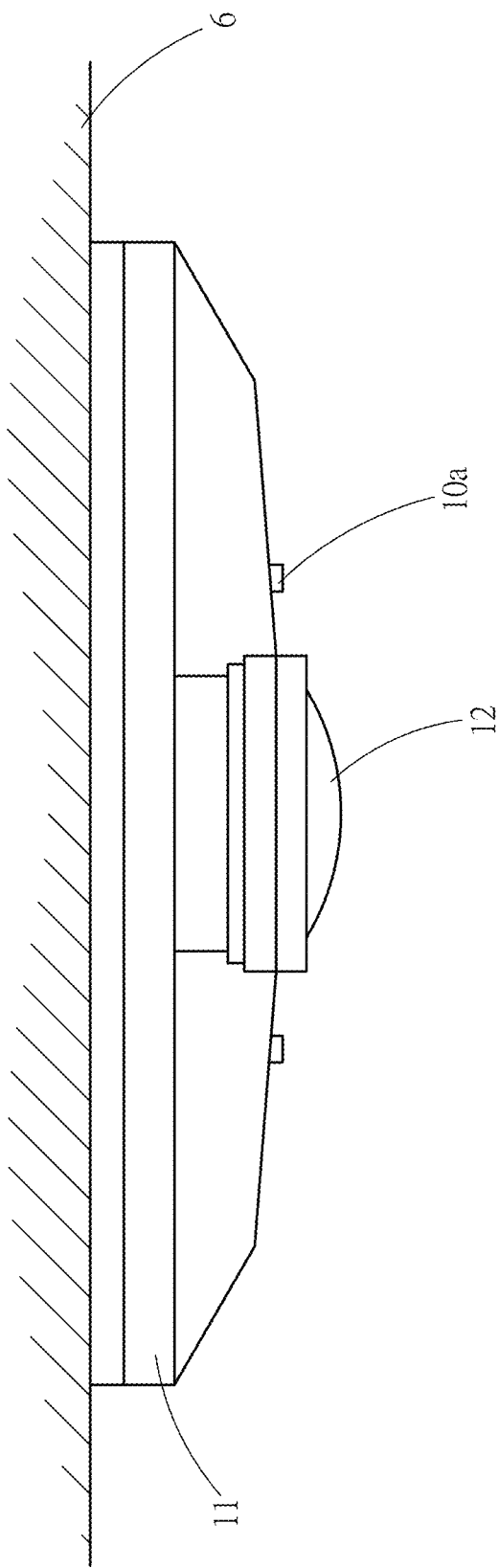
FIG. 11 is a schematic side-elevational view illustrating the surveillance camera device of FIG. 10 mounted to a ceiling.

Referring to FIG. 11, which is a schematic side-elevational view illustrating the surveillance camera device of FIG. 10 mounted to a ceiling. Reference being also had to FIG. 1, as shown in the drawings, when the surveillance camera device 1 is mounted to the ceiling 6, with the image capturing element 12 being a fisheye lens, the image capturing element 12 may capture an image covering the ceiling 6 and the space under the ceiling 6, and the light-emitting diode 10a may directly generate a non-symmetric light shape 21 required by the imaging system arranged inside the surveillance camera device 1 so as to increase coverage and reduce dark zones of image information. Compared to the prior art, the surveillance camera device 1 of the present invention does not require multiple optical elements to carry out refraction and reflection of secondary optics, thereby effectively reducing the overall size of the security surveillance system and helping achieve thinning of the system. Further, the optical energy of the non-symmetric light shape 21 is increased by 10%~20% as compared to the optical energy of the conventionally used secondary optics. In other words, optical loss can be lower than the secondary optics by 10%~20%, so as to improve utilization performance and homogeneity of the light source, achieving an effect of lowering down overall power consumption of the surveillance camera device 1 and also achieving reduction of distortion resulting from image compression and conversion.

Figure 12:
FIG. 12 shows an imaging result of a surveillance camera device according to the third embodiment of the present invention.
Figure 13:
FIG. 13 shows an imaging result of a conventional surveillance camera device.
Figure 14A:
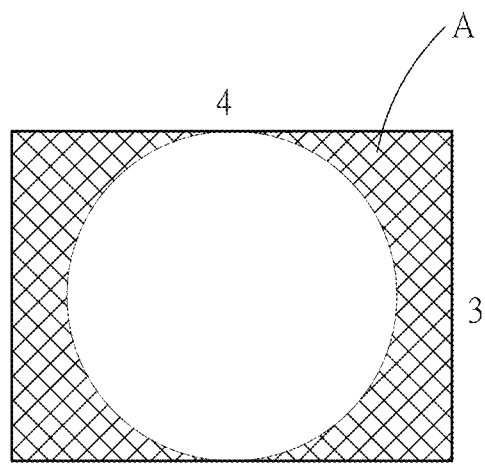
FIG. 14a is a schematic view illustrating image information acquired with a conventional surveillance camera device.
Figure 14B:
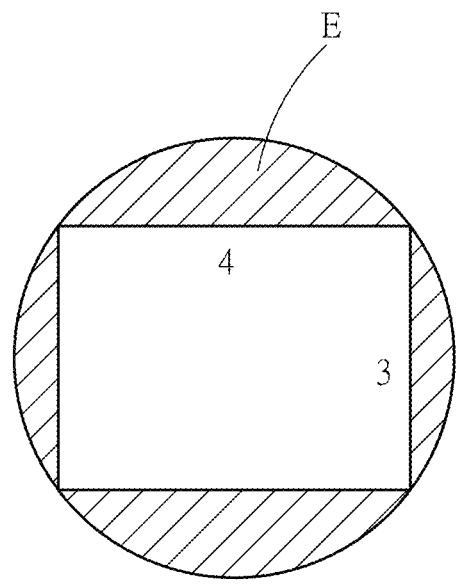
FIG. 14b is a schematic view illustrating image information acquired with a conventional surveillance camera device.
Figure 15:
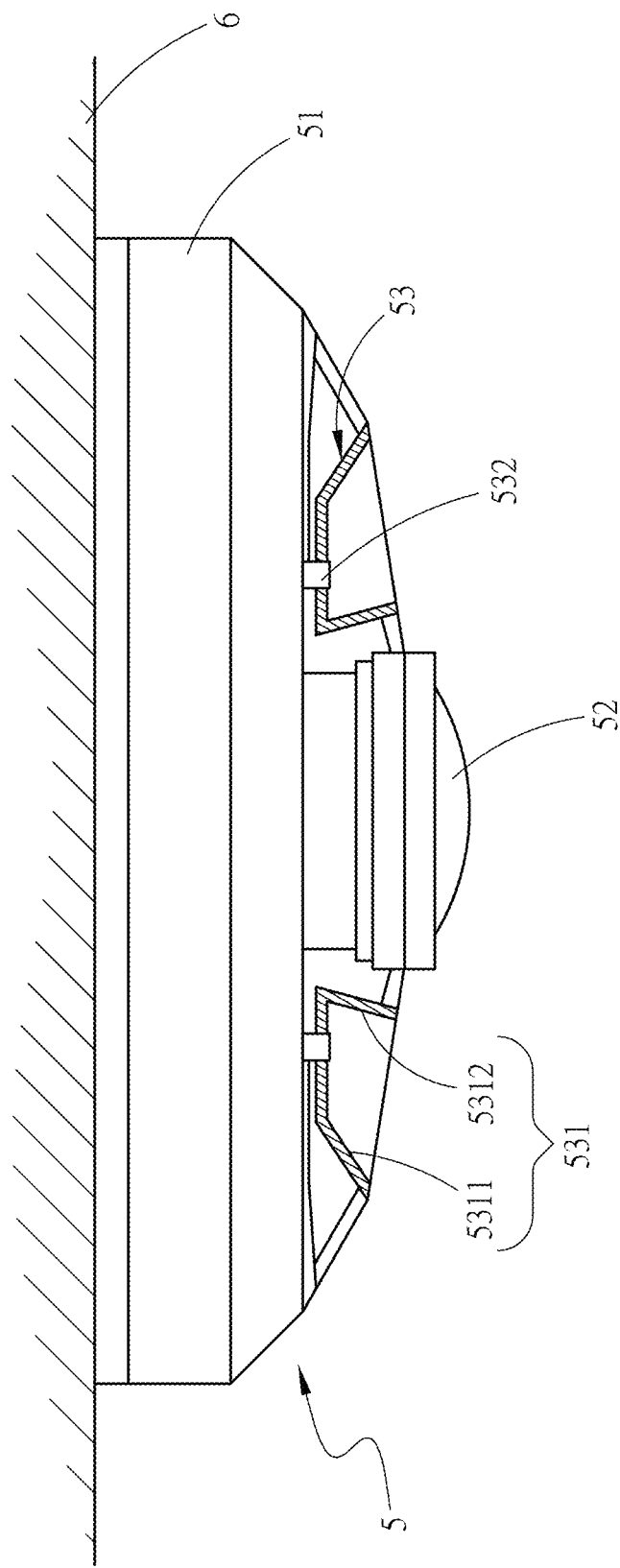
FIG. 15 is a schematic view illustrating a conventional surveillance camera device mounted to a ceiling.

Further referring to FIG. 13, which shows an imaging result of a conventional surveillance camera device, as shown in the drawing, the prior art light shape is a circular-symmetry light shape so that the light intensity at a central portion is far greater than that of a peripheral portion, and thus, the peripheral zone of image information is completely a dark zone. Referring to FIG. 12, which shows an imaging result of a surveillance camera device according to the third embodiment of the present invention, with additional reference to FIG. 4, as shown in the drawing, the non-symmetric light shape 21 generated by the light-emitting diode 10c according to the present invention provides high homogeneity and illumination so that when used in a surveillance camera device of a security surveillance system, it can help improve coverage and reduce dark zone of the image information and does not requires multiple optical elements for reflection and refraction for secondary optics thereby increasing optical energy and further reducing the overall size of the security surveillance system.

In summary, the light-emitting diode according to the present invention and the surveillance camera device using the light-emitting diode are applicable to a security surveillance system, wherein the light-emitting diode adopts primary optic design to allow for direct projection of non-symmetric light shape for matching an imaging system of the surveillance camera device, without the need of additional optical elements for multiple times of reflection for secondary optics thereby effectively improving utilization performance of the light source, reducing power consumption of the surveillance camera device, and also simplifying parts design of the security surveillance system to reduce overall size thereof.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A light-emitting diode (LED) that provides high intensity, coverage, and homogenous illumination, the LED comprising, in combination:
    a substrate that has an installation surface;
    a wiring layer portion formed on the installation surface;
    an LED chip, which is directly mounted on the installation surface and is in electrical connection with the wiring layer portion, the LED chip being square in shape and comprising an optical axis; and
    an optical lens that is formed on and fixedly mounted to the installation surface through overmolding to directly encapsulate the LED chip and the wiring layer portion such that the optical lens is set directly in tight engagement with the substrate, the wiring layer portion and the LED chip and the optical lens has no air gap with respect to the substrate, the wiring layer portion and the LED chip, the encapsulated wiring layer portion being formed of a material to function as a light reflector, the optical lens being asymmetric and formed of a light transmitting material, the optical lens being formed to comprise a light exit surface, wherein a large width extension direction of the light exit surface is defined as an X-axis direction; a small width extension direction of the light exit surface is defined as a Y-axis direction, wherein the X-axis direction and the Y-axis direction are perpendicular to each other; and a direction perpendicular to the installation surface is defined as a Z-axis direction, wherein the light exit surface protrudes from the installation surface in the Z-axis direction, the light exit surface is formed of at least two curved surfaces having different curvatures;
    wherein a surface middle portion of light exit surface is recessed along the optical axis to define a divergent surface and an outer portion of the light exit surface extends toward the installation surface to define a convergent surface;
    wherein the divergent surface has negative diopter and the convergent surface has positive diopter;
    wherein a light beam emitting from the LED chip travels in a direction along the optical axis and is subjected to refraction by the divergent surface and the convergent surface to form a non-symmetric light shape having high homogeneity;
    wherein the light exit surface has a contour having an M-shape in the X-axis direction having two end portions in the X-axis direction raised and is recessed along the optical axis and the light exit surface has an arch shape in the Y-axis direction that is raised along the optical axis and has two end portions extending in the Y-axis direction; and
    wherein the optical lens satisfies the following conditions:

$0.3 < D1/D2 \leq 3$, and $0.65 < D3/D4 < 1$;

where D1 is the widthwise distance between two outermost side edges of the light exit surface along the Y-axis; D2 is the lengthwise distance between two opposite ends of the light exit surface along the X-axis; D3 is a distance from the installation surface to a lowest surface of the divergent surface in a direction along the optical axis; and D4 is a distance from the installation surface to a highest surface of the convergent surface in a direction along the optical axis;

wherein the optical lens further satisfies the following conditions:

$0.1 \leq L1/D1 \leq 0.5$; and $0.1 \leq L2/D2 \leq 0.5$, where D1 is the widthwise distance between two outermost side edges of the light exit surface along the Y-axis; D2 is the lengthwise distance between two opposite ends of the light exit surface along the X-axis; L1 is a widthwise distance of the LED chip along the Y-axis; and L2 is a lengthwise distance of the LED chip along the X-axis.

2. The LED as claimed in claim 1, wherein the convergent surface has a diopter value between 25 and 100 and the divergent surface has a diopter value between −1500 and −500.

3. The LED as claimed in claim 1, wherein the non-symmetric light shape is a rectangular light shape or an elliptic light shape that has an aspect ratio between 1.51 and 1.6.

4. The LED as claimed in claim 1, wherein multiple ones of the light-emitting diode chip are arranged in a n*n (n by n) square light emission array, n being a positive integer greater than or equal to 2, the multiple light-emitting diode chips being arranged in tight arrangement with respect to each other.

5. The LED as claimed in claim 1, wherein the encapsulated wiring layer portion is formed of gold to increase reflectivity thereof.

6. The LED as claimed in claim 2, wherein a half-power view angle on a plane passing through the optical axis and in the X-axis direction is between 40 and 160 degrees and a half-power view angle on a plane passing the optical axis and in a direction orthogonal to and perpendicular to the X-axis direction is between 30 and 100 degrees.

7. The LED as claimed in claim 2, wherein the light-emitting diode chip generates infrared light having a wavelength between 790 and 830 nm, or infrared light having a wavelength between 830 and 870 nm, or infrared light having a wavelength between 900 and 1000 nm.

8. The LED as claimed in claim 4, wherein the multiple light-emitting diode chips are spaced from each other by a spacing distance between 0.0508 mm and 0.1016 mm.

9. The LED as claimed in claim 6, wherein the light exit surface is an aspheric surface satisfying the following conditions $$z = \frac{cr^2}{1 + \sqrt{1 - (1+k)c^2 r^2}} + \sum_{i=1}^{n} a_i a^{2i}$$

where $c = 1/r$;
$r = 9.03$; and
$k = -0.522$ wherein r denote the curvature of radius of apex; c denotes curvature; and k denotes conic constant.

10. The LED as claimed in claim 6, wherein the light exit surface of the optical lens is a free-form surface and the half-power view angle on a plane passing through the optical axis and in the X-axis direction is 130 degrees in a bat-wing shape and the half-power view angle on a plane passing the optical axis and in a direction orthogonal to and perpendicular to the X-axis direction is 85 degrees in a light concentration form.

11. The LED as claimed in claim 9, wherein the diopter value of the convergent surface is 25 and the diopter value of the divergent surface is −500.

12. The LED as claimed in claim 10, wherein a maximum luminous intensity emitting from the light exit surface is located between 40° and 60° and luminous intensity of normal vector is 75% of the maximum luminous intensity.

13. The LED as claimed in claim 11, wherein the half-power view angle on a plane passing through the optical axis and in the X-axis direction is 47 degrees and the half-power view angle on a plane passing the optical axis and in a direction orthogonal to and perpendicular to the X-axis direction is 31 degrees.

\* \* \* \* \*